United States Patent
Maturana et al.

(10) Patent No.: US 10,208,947 B2
(45) Date of Patent: Feb. 19, 2019

(54) CLOUD-LEVEL ANALYTICS FOR BOILER NETWORKS

(71) Applicant: Rockwell Automation Technologies, Inc., Mayfield Heights, OH (US)

(72) Inventors: Francisco Maturana, Lyndhurst, OH (US); Juan L. Asenjo, Timberlake, OH (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 10 days.

(21) Appl. No.: 14/562,233

(22) Filed: Dec. 5, 2014

(65) Prior Publication Data

US 2015/0276208 A1    Oct. 1, 2015

Related U.S. Application Data

(60) Provisional application No. 61/970,798, filed on Mar. 26, 2014.

(51) Int. Cl.
*F22B 35/18* (2006.01)
*G06F 9/50* (2006.01)
*G05B 13/04* (2006.01)

(52) U.S. Cl.
CPC .............. *F22B 35/18* (2013.01); *G05B 13/04* (2013.01); *G06F 9/5072* (2013.01)

(58) Field of Classification Search
CPC .......... F22B 35/18; F22B 33/00; F22B 35/00; G06F 9/5072; G05B 13/04
See application file for complete search history.

(56) References Cited

U.S. PATENT DOCUMENTS

| 5,519,605 A | 5/1996 | Cawlfield |
| 6,230,010 B1 | 5/2001 | Morris |

(Continued)

FOREIGN PATENT DOCUMENTS

| CN | 1755564 | 4/2006 |
| CN | 1937559 | 3/2007 |

(Continued)

OTHER PUBLICATIONS

Extended European Search Report for EP Application Serial No. 15160989.8, dated Sep. 22, 2016, 5 pages.

(Continued)

*Primary Examiner* — Shogo Sasaki
(74) *Attorney, Agent, or Firm* — Amin, Turocy & Watson, LLP

(57) ABSTRACT

A boiler control system executing on a cloud platform facilitates remote control system analysis and generation of suitable set point parameters for a given boiler application. The system includes a system interface component, a modeling component and a correlation analytics component. The system interface component collects industrial data associated with a set of boilers and demand data associated with a set of loads. The system interface component also stores the industrial data and the demand data on a cloud platform. The modeling component generates a boiler behavioral model for storage on the cloud platform based on analysis of the industrial data and the demand data. The boiler behavioral model defines at least one correlation between efficiency and capacity associated with the set of boilers. The correlation analytics component determines at least one set point parameter for the set of boilers based on analysis of the boiler behavioral model.

20 Claims, 17 Drawing Sheets

(56) References Cited

U.S. PATENT DOCUMENTS

| | | |
|---|---|---|
| 6,609,034 B1 | 8/2003 | Behrens et al. |
| 6,640,241 B1 | 10/2003 | Ozzie et al. |
| 6,675,226 B1 | 1/2004 | Nair et al. |
| 7,133,908 B1 | 11/2006 | Pajak et al. |
| 7,159,209 B1 | 1/2007 | Srinivasan et al. |
| RE39,989 E | 1/2008 | Morris |
| 7,676,287 B2 | 3/2010 | Eryurek et al. |
| 8,219,216 B2 | 7/2012 | Klug et al. |
| 8,275,847 B2 | 9/2012 | Lewis |
| 2001/0053992 A1* | 12/2001 | Eto ............... G06Q 10/06 705/7.23 |
| 2002/0133270 A1* | 9/2002 | Hung ................ F22B 35/18 700/286 |
| 2002/0178159 A1* | 11/2002 | O'Brien ......... G06F 17/30539 |
| 2003/0014387 A1 | 1/2003 | Kreidler et al. |
| 2003/0083754 A1 | 5/2003 | Tripathi et al. |
| 2003/0212818 A1 | 11/2003 | Klein et al. |
| 2004/0141517 A1 | 7/2004 | Balasubramanian et al. |
| 2004/0230859 A1 | 11/2004 | Cochran et al. |
| 2005/0010333 A1 | 1/2005 | Lorton et al. |
| 2005/0154477 A1 | 7/2005 | Martin et al. |
| 2005/0193285 A1 | 9/2005 | Jeon |
| 2006/0068762 A1 | 3/2006 | Baldwin et al. |
| 2006/0294047 A1 | 12/2006 | Johnston et al. |
| 2007/0019641 A1 | 1/2007 | Pai et al. |
| 2008/0027704 A1 | 1/2008 | Kephart et al. |
| 2008/0168092 A1 | 7/2008 | Boggs et al. |
| 2008/0317058 A1 | 12/2008 | Williams |
| 2009/0089227 A1 | 4/2009 | Sturrock et al. |
| 2009/0183201 A1 | 7/2009 | Dasgupta |
| 2009/0198350 A1 | 8/2009 | Thiele |
| 2009/0265036 A1 | 10/2009 | Jamieson et al. |
| 2009/0326892 A1 | 12/2009 | Lin |
| 2010/0070852 A1 | 3/2010 | Li |
| 2010/0256794 A1 | 10/2010 | McLaughlin et al. |
| 2010/0256795 A1 | 10/2010 | McLaughlin et al. |
| 2010/0257228 A1 | 10/2010 | Staggs et al. |
| 2011/0066298 A1 | 3/2011 | Francino |
| 2011/0103393 A1 | 5/2011 | Meier et al. |
| 2011/0134930 A1 | 6/2011 | McLaren et al. |
| 2011/0145836 A1 | 6/2011 | Wheeler et al. |
| 2011/0264622 A1 | 10/2011 | Vargas et al. |
| 2012/0143378 A1 | 6/2012 | Spears et al. |
| 2012/0144202 A1 | 6/2012 | Counterman |
| 2012/0166963 A1 | 6/2012 | Kohli et al. |
| 2012/0232869 A1 | 9/2012 | Maturana et al. |
| 2012/0331104 A1 | 12/2012 | Akiyama et al. |
| 2013/0067090 A1 | 3/2013 | Batrouni et al. |
| 2013/0081146 A1 | 3/2013 | Hakozaki |
| 2013/0110298 A1 | 5/2013 | Beveridge |
| 2013/0123965 A1 | 5/2013 | Cooper et al. |
| 2013/0124253 A1 | 5/2013 | Cooper et al. |
| 2013/0150986 A1 | 6/2013 | Timsjo et al. |
| 2013/0191106 A1 | 7/2013 | Kephart et al. |
| 2013/0211559 A1 | 8/2013 | Lawson et al. |
| 2013/0211870 A1 | 8/2013 | Lawson et al. |
| 2013/0212420 A1 | 8/2013 | Lawson et al. |
| 2013/0225151 A1 | 8/2013 | King et al. |
| 2013/0227446 A1 | 8/2013 | Zala et al. |
| 2013/0262678 A1 | 10/2013 | Tung et al. |
| 2013/0266193 A1 | 10/2013 | Tiwari et al. |
| 2013/0269020 A1 | 10/2013 | Griffin et al. |
| 2013/0283151 A1 | 10/2013 | Deguzman et al. |
| 2013/0290952 A1 | 10/2013 | Childers, Jr. |
| 2014/0047107 A1 | 2/2014 | Maturana et al. |
| 2014/0147064 A1 | 2/2014 | Maturana et al. |
| 2014/0115592 A1 | 4/2014 | Frean et al. |
| 2014/0156234 A1 | 6/2014 | Maturana et al. |
| 2014/0157368 A1 | 6/2014 | Shah et al. |
| 2014/0164124 A1 | 6/2014 | Rhoads |
| 2014/0207868 A1 | 7/2014 | Gordon et al. |
| 2014/0257528 A1 | 9/2014 | Perez et al. |
| 2014/0269531 A1 | 9/2014 | Luna et al. |
| 2014/0274005 A1 | 9/2014 | Luna et al. |
| 2014/0280796 A1 | 9/2014 | Pijewski |
| 2014/0282015 A1 | 9/2014 | Nixon et al. |
| 2014/0337473 A1 | 11/2014 | Frusina et al. |
| 2015/0220080 A1 | 8/2015 | Nixon et al. |
| 2016/0023351 A1 | 1/2016 | Kuffner et al. |
| 2016/0142396 A1 | 5/2016 | McRoberts et al. |
| 2016/0256775 A1 | 9/2016 | Gustafson et al. |
| 2017/0212562 A1 | 7/2017 | Wang et al. |

FOREIGN PATENT DOCUMENTS

| | | |
|---|---|---|
| CN | 103293953 | 9/2013 |
| CN | 203466840 | 3/2014 |
| CN | 103701953 A | 4/2014 |
| EP | 1422619 | 5/2004 |
| EP | 2228965 | 9/2010 |
| EP | 2541354 | 1/2013 |
| EP | 2592812 | 5/2013 |
| EP | 2660667 | 11/2013 |
| EP | 2704401 | 3/2014 |

OTHER PUBLICATIONS

Extended European Search Report for EP Application Serial No. 15160988.0, dated Sep. 16, 2016, 9 pages.
European Office Action for EP Application Serial No. 15160941.9, dated Aug. 29, 2016, 2 pages.
European Office Action for EP Application Serial No. 15160980.7, dated Sep. 5, 2016, 2 pages.
Office Action for U.S. Appl. No. 14/525,131, dated Oct. 4, 2016, 56 pages.
Office Action for U.S. Appl. No. 14/634,174, dated Nov. 4, 2016, 25 pages.
European Office Action for EP Application Serial No. 15160988.0, dated Oct. 24, 2016, 2 pages.
Extended European Search Report for EP Application Serial No. 15160984.9, dated Jul. 4, 2016, 10 pages.
European Office Action for EP Application Serial No. 15160984.9, dated Aug. 8, 2016, 2 pages.
Extended European Search Report for EP Application Serial No. 15160944.3, dated Jul. 8, 2016, 9 pages.
European Office Action for EP Application Serial No. 15160944.3, dated Aug. 16, 2016, 2 pages.
Extended European Search Report for EP Application Serial No. 15160868.4, dated Jun. 29, 2016, 11 pages.
European Office Action for EP Application Serial No. 15160868.4, dated Aug. 1, 2016, 2 pages.
Extended European Search Report for EP Application Serial No. 15160980.7, dated Jul. 28, 2016, 10 pages.
Extended European Search Report for EP Application Serial No. 15160924.5, dated Jul. 14, 2016, 10 pages.
European Office Action for EP Application Serial No. 15160924.5, dated Aug. 22, 2016, 2016, 2 pages.
Extended European Search Report for EP Application Serial No. 15160941.9, dated Jul. 27, 2016, 12 pages.
Extended European Search Report for EP Application Serial No. 15160987.2, dated Jul. 11, 2016, 9 pages.
European Office Action for EP Application Serial No. 15160987.2, dated Aug. 16, 2016, 2 pages.
Office Action for U.S. Appl. No. 14/525,131, dated Jun. 28, 2016, 36 pages.
Office Action for U.S. Appl. No. 14/665,128, dated Jul. 20, 2016, 9 pages.
Office Action for U.S. Appl. No. 14/634,174, dated Aug. 4, 2016, 11 pages.
Steiner, J. G., et al., "Kerberos: An Authentication Service for Open Network Systems," Proceedings of the Winter Usenix Conference, Feb. 9, 1988, pp. 191-202.
Office Action from U.S. Appl. No. 14/525,144, dated Sep. 9, 2016, 28 pages.
Office Action for Chinese Application No. 201510136419.4, dated Apr. 21, 2017, 10 pages.
Office Action for Chinese Application No. 201510135130.0, dated May 3, 2017, 15 pages.

(56) References Cited

OTHER PUBLICATIONS

Office Action for U.S. Appl. No. 14/478,974, dated Jun. 15, 2017, 11 pages.
Office Action for U.S. Appl. No. 14/619,933 dated May 15, 2017, 11 pages.
Office Action for Chinese Application No. 201510138371.0 dated May 4, 2017, 15 pages.
Final Office Action for U.S. Appl. No. 14/525,149, dated Jul. 7, 2017, 77 pages.
Office Action for U.S. Appl. No. 14/634,174, dated Feb. 3, 2017, 12 pages.
Office Action for U.S. Appl. No. 14/639,279, dated Feb. 10, 2017, 110 pages.
Office Action for U.S. Appl. No. 14/525,131, dated Feb. 3, 2017, 21 pages.
Office Action for U.S. Appl. No. 14/525,144, dated Feb. 3, 2017, 42 pages.
Office Action for U.S. Appl. No. 14/525,149, dated Feb. 27, 2017, 76 pages.
Office Action for U.S. Appl. No. 14/525,149 dated Oct. 5, 2017, 88 pages.
Chinese Office Action for Chinese Application Serial No. 201510138210.1 dated Jul. 12, 2017, 14 pages (with English translation).
Final Office Action for U.S. Appl. No. 14/639,279, dated Aug. 9, 2017, 66 pages.
Office Action for U.S. Appl. No. 14/639,279 dated Nov. 15, 2017, 75 pages.
Office Action for U.S. Appl. No. 15/431,128 dated Oct. 18, 2017, 37 pages.
Office Action for Chinese Application Serial No. 201510138371.0 dated Nov. 14, 2017, 5 pages.
European Office Action for European Application Serial No. 15160984.9 dated Feb. 15, 2018, 7 pages.
European Office Action for European Application Serial No. 15160941.9, dated Jan. 15, 2018, 5 pages.
European Office Action for European Application Serial No. 15160868.4, dated Jan. 10, 2018, 8 pages.
European Office Action for European Application Serial No. 15160924.5, dated Feb. 8, 2018, 5 pages.
European Office Action for European Application Serial No. 15160944.3, dated Feb. 15, 2018, 7 pages.
European Office Action for European Application Serial No. 15160980.7, dated Feb. 15, 2018, 8 pages.
European Office Action for European Application Serial No. 15160987.2, dated Feb. 12, 2018, 7 pages.
European Office Action for European Application Serial No. 15160988.0, dated Feb. 9, 2018, 5 pages.
Non-Final Office Action for U.S. Appl. No. 15/271,752 dated Apr. 13, 2018, 56 pages.
Office Action for U.S. Appl. No. 15/271,752 dated Oct. 5, 2018, 35 pages.

* cited by examiner

US 10,208,947 B2

CLOUD-LEVEL ANALYTICS FOR BOILER NETWORKS

CROSS-REFERENCE TO RELATED APPLICATIONS

This application claims priority to U.S. Provisional Application Ser. No. 61/970,798, filed on Mar. 26, 2014, entitled "INDUSTRIAL CLOUD INFRASTRUCTURE FOR DATA INGESTION, MODELING, PROCESSING, ANALYTICS, AND REPORTING," the entirety of which is incorporated herein by reference.

BACKGROUND

The subject matter disclosed herein relates generally to industrial control systems, and, more particularly, to a cloud-based boiler control system that generates recommended set point parameters based on collection and analysis of data from an industrial boiler system.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system includes a system interface component, a modeling component and a correlation analytics component. The system interface component collects industrial data associated with a set of boilers and demand data associated with a set of loads. The system interface component also stores the industrial data and the demand data on a cloud platform. The modeling component generates a boiler behavioral model for storage on the cloud platform based on analysis of the industrial data and the demand data. The boiler behavioral model defines at least one correlation between efficiency and capacity associated with the set of boilers. The correlation analytics component determines at least one set point parameter for the set of boilers based on analysis of the boiler behavioral model.

Also, one or more embodiments provide a method for receiving, at a cloud platform by a system comprising at least one processor, industrial data from one or more boilers of an industrial boiler system and demand data from one or more loads of the industrial boiler system. The method also includes creating, by the system, a boiler behavioral model based on analysis of the industrial data and the demand data including storing the boiler behavioral model on cloud storage of the cloud platform, wherein the boiler behavioral model encodes at least one correlation between efficiency and capacity associated with the one or more boilers. Additionally, the method includes determining, by the system, at least one set point parameter for the one or more boilers based on an analysis of the boiler behavioral model.

Also, according to one or more embodiments, a non-transitory computer-readable medium is provided having stored thereon instructions that, in response to execution, cause a system to perform operations, the operations, comprising receiving, via a cloud platform, industrial data from one or more boilers of an industrial boiler system and demand data from one or more loads of the industrial boiler system. The operations also comprise generating a boiler behavioral model based on analysis of the industrial data and the demand data, wherein the boiler behavioral model defines at least one correlation between efficiency and capacity associated with the one or more boilers. Additionally, the operations comprise storing the boiler behavioral model on cloud storage of the cloud platform. Also, the operations comprise generating at least one set point parameter for the one or more boilers based on an analysis of the boiler behavioral model.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
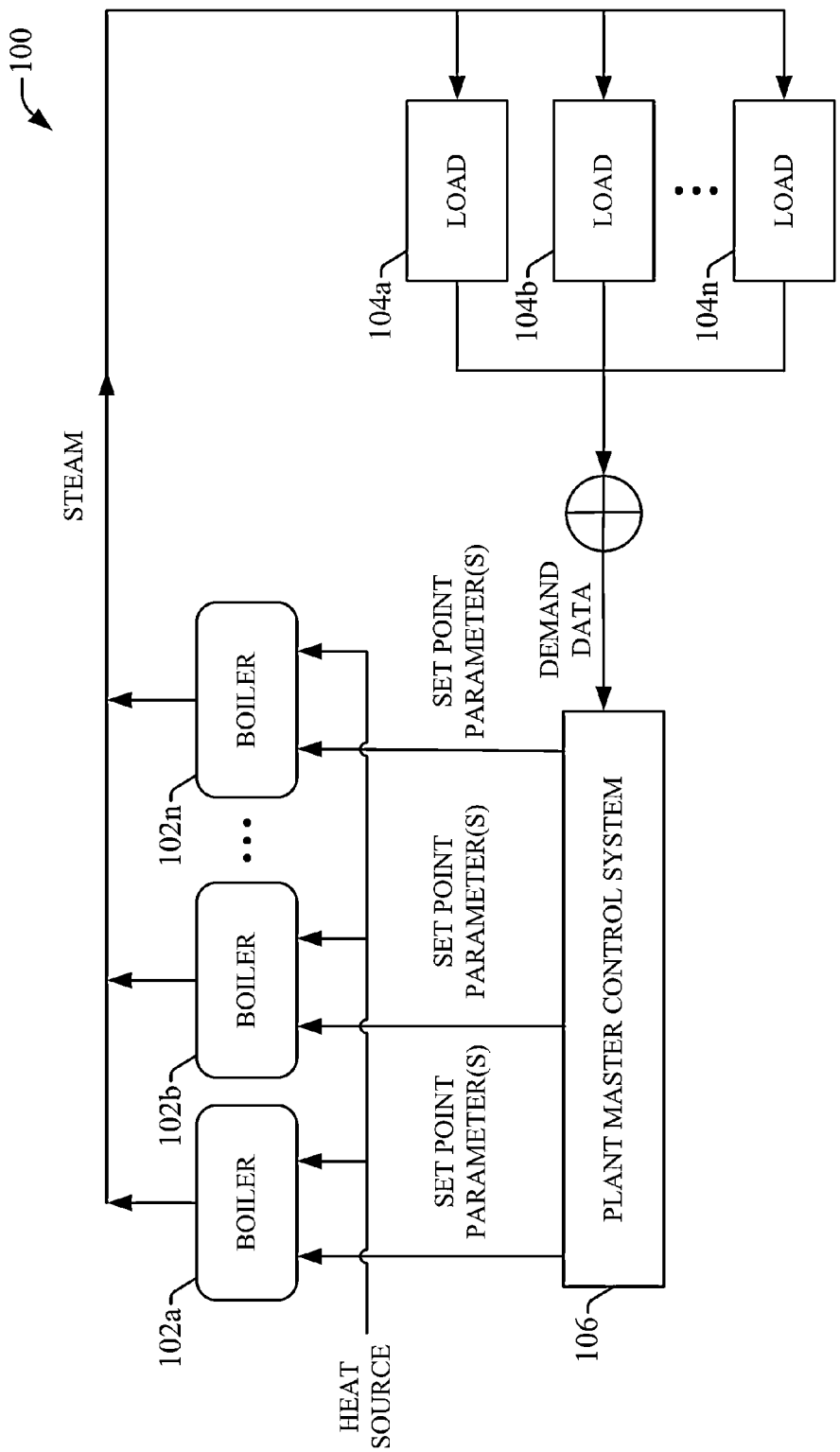
FIG. 1 is a block diagram of a simplified boiler control architecture.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers and their associated I/O devices are central to the operation of modern automation systems. These controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such programming structures.

FIG. 1 illustrates an example system 100 associated with a simplified boiler control architecture. System 100 can include boilers 102*a*-*n*. The boilers 102*a*-*n* can be configured to heat water or another type of fluid. Furthermore, the boilers 102*a*-*n* can provide output to the loads 104*a*-*n*. The loads 104*a*-*n* can include, but are not limited to, one or more heating loads, one or more process loads and/or one or more combination loads. In an implementation, the boilers 102*a*-*n* can provide steam (e.g., STEAM shown in FIG. 1) to the loads 104*a*-*n* (e.g., via a steam header, a pipeline, etc.). In one example, steam provided to the loads 104*a*-*n* by the boilers 102*a*-*n* can be low pressure steam. In another example, steam provided to the loads 104*a*-*n* by the boilers 102*a*-*n* can be high pressure steam. However, it is to be appreciated that the boilers 102*a*-*n* can provide different output to the loads 104*a*-*n*.

The boilers 102*a*-*n* can each receive a heat source (e.g., HEAT SOURCE shown in FIG. 1). The heat source can be fuel to heat the water or the other type of fluid. For example, the boilers 102*a*-*n* can receive fuel oil, natural gas, coal and/or wood. However, it is to be appreciated that the boilers 102*a*-*n* can additionally or alternatively employ another type of energy, such as but not limited to, electric energy and/or nuclear energy. Each of the boilers 102*a*-*n* can comprise a different efficiency and/or a different capacity. For example, a first boiler 102a can be associated with a first efficiency and a first capacity, a second boiler 102b can be associated with a second efficiency and a second capacity, a third boiler 102n can be associated with a third efficiency and a third capacity, etc. Furthermore, each of the loads 104a-n can be associated with a demand. For example, a first load 104a can be associated with a first demand, a second load 104b can be associated with a second demand, a third load 104n can be associated with a third demand, etc.

The boilers 102-n can receive one or more set point parameters (e.g., operating setpoints) from a plant master control system 106. For example, demand data (e.g., DEMAND DATA shown in FIG. 1) associated with the loads 104a-n can be provided to a plant master control system 106 and/or the plant master control system 106 can generate the one or more set point parameters based on the demand data associated with the loads 104a-n. A set point parameter can be associated with a target state for the boilers 102a-n. The target state can be, for example, a desired value of a process parameter (e.g., a temperature, a pressure, a flow, a tank level, etc.). Demand data associated with the loads 104a-n can be a total demand (e.g., a required demand) associated with the loads 104a-n. For example, a demand associated with each of the loads 104a-n can be added to determine a total demand (e.g., a required demand) associated with the loads 104a-n.

In general, operators wish to operate the boilers 102a-n to meet the combined demand of loads 104a-n while maximizing efficiency. The challenge is to determine which of the boilers 102a-n to operate and/or to determine set point parameters for each of the boilers 102a-n, such that the total demands are optimally met and operational constraints (e.g., emission limits, etc.) are respected.

In order to simplify the process of determining suitable set point parameters and/or which boilers to operate for a boiler system application, one or more embodiments of the present disclosure provide a boiler control system that executes on a cloud platform. The cloud-based boiler control system automatically identifies suitable set point parameters for a given boiler system application by leveraging cloud-side analytics and a boiler behavioral model generated based on industrial data and/or demand data collected and maintained on cloud storage (e.g., big data storage). The boiler behavioral model creates a virtual association between efficiency and capacity associated with a set of boilers in a boiler system application based on industrial data and/or demand data collected for the boiler control system. To this end, the cloud-based boiler control system monitors industrial data (e.g., process variables, other operational data, etc.) and/or demand data for the boiler control system, and incrementally builds a high-fidelity model of the boiler system over time as new system data is collected into the cloud. The boiler control system can apply iterative analytics to the model until set point parameters are converged upon that satisfy a defined optimization criterion (e.g., efficiency criterion and/or capacity criterion, maximum efficiency, etc.), and provide the calculated set point parameters to a user's client device, or directly to a controller (e.g., a plant master control system) and/or other industrial devices on the plant floor. Thus, the boiler control system described herein mitigates the need to manually determine set point parameters and/or which boilers to operate using trial-and-error methods by leveraging big data analysis and machine modeling in the cloud platform to automatically generate suitable set point parameters for a given boiler control application. Moreover, since the boiler control system executes on a cloud platform as a generic boiler system, the cloud-based boiler control functionality can be provided as a service that is globally accessible to different end users regardless of location.

Figure 2:
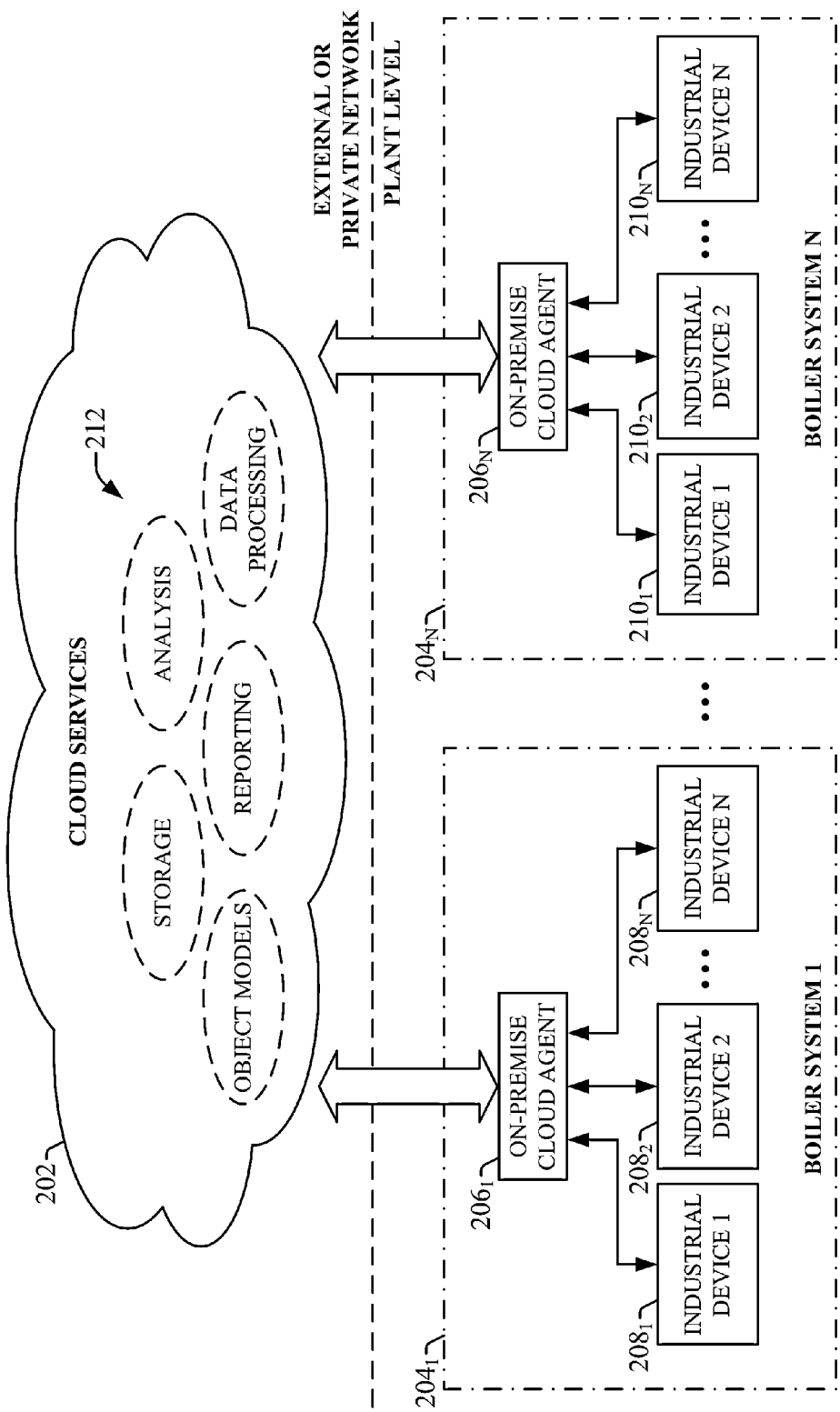
FIG. 2 is a block diagram depicting an example high-level overview of an industrial enterprise that leverages cloud-based services.

To illustrate an example cloud architecture that can be used to provide cloud-based boiler control services, an example high-level overview of an industrial enterprise (e.g., one or more boiler systems) that leverages cloud-based services is now described in connection with FIG. 2.

The industrial enterprise comprises one or more boiler systems 204, each having a number of industrial devices 208 and 210 in use. The industrial devices 208 and 210 can be associated with and/or can include one or more boilers and/or one or more loads operating within the respective boiler systems 204. Industrial devices 208 and 210 can include such devices as field devices such as sensors (e.g., analog sensors, digital sensors, etc.), meters and/or alarms; industrial controllers (e.g., programmable logic controllers or other types of programmable automation controllers); operator interfaces (e.g., human-machine interfaces, industrial monitors, graphic terminals, message displays, etc.); vision system devices (e.g., vision cameras); or other such industrial devices associated with a boiler and/or a load.

Example automation systems can include one or more industrial controllers that facilitate monitoring and control of their respective processes. The controllers exchange data with the industrial devices 208 and 210 using native hard-wired I/O or via a plant network such as EtherNet/IP, Data Highway Plus, ControlNet, Devicenet, or the like. A given controller typically receives any combination of digital or analog signals from the industrial devices 208 and 210 indicating a current state of the devices and their associated processes (e.g., temperature, pressure, fluid level, etc.), and executes a user-defined control program that performs automated decision-making for the controlled processes based on the received signals. The controller then outputs appropriate digital and/or analog control signaling to the industrial devices 208 and 210 in accordance with the decisions made by the control program. These outputs can include device actuation signals, temperature or pressure control signals, operational commands, process commands, and the like. The control program can comprise any suitable type of code used to process input signals read into the controller and to control output signals generated by the controller, including but not limited to ladder logic, sequential function charts, function block diagrams, structured text, or other such platforms.

According to one or more embodiments, on-premise cloud agents 206 can collect data from industrial devices 208 and 210—or from other data sources, including but not limited to data historians, business-level systems, etc.—and send this data to cloud platform 202 for processing and storage. Cloud platform 202 can be any infrastructure that allows cloud services 212 (such as the cloud-based boiler control system described herein) to be accessed and utilized by cloud-capable devices. Cloud platform 202 can be a public cloud accessible via the Internet by devices having Internet connectivity and appropriate authorizations to utilize the cloud services 212. In some scenarios, cloud platform 202 can be provided by a cloud provider as a platform-as-a-service (PaaS), and the cloud services 212 can reside and execute on the cloud platform 202 as a cloud-based service. In some such configurations, access to the cloud platform 202 and the cloud services 212 can be provided to customers as a subscription service by an owner of the cloud services 212. Alternatively, cloud platform 202 can be a private or semi-private cloud operated internally by the enterprise, or a shared or corporate cloud environment. An exemplary private cloud can comprise a set of servers hosting the cloud services 212 and residing on a corporate network protected by a firewall.

Cloud services 212 can include, but are not limited to, data storage, data analysis, control applications (e.g., applications that can generate and deliver control instructions to industrial devices 208 and 210 based on analysis of real-time system data or other factors), visualization applications such as the cloud-based operator interface system described herein, reporting applications, Enterprise Resource Planning (ERP) applications, notification services, or other such applications. Cloud-based data analytics can include embodiments of the boiler control system described herein. Cloud platform 202 may also include one or more object models to facilitate data ingestion and processing in the cloud. If cloud platform 202 is a web-based cloud, cloud agents 206 at the respective boiler systems 204 may interact with cloud services 212 directly or via the Internet. In an exemplary configuration, the industrial devices 208 and 210 connect to the on-premise cloud agents 206 through a physical or wireless local area network or radio link. In another exemplary configuration, the industrial devices 208 and 210 may access the cloud platform 202 directly using integrated cloud agents. Cloud agents and their associated data collection and processing services are discussed in more detail below.

Ingestion of industrial device data in the cloud platform 202 through the use of cloud agents 206 can offer a number of advantages particular to boiler control systems. For one, cloud-based storage offered by the cloud platform 202 can be easily scaled to accommodate the large quantities of data generated daily by an industrial enterprise (e.g., one or more boiler systems). Moreover, multiple boilers and/or multiple boiler systems can migrate respective industrial data and/or demand data to the cloud for aggregation, collation, collective analysis, visualization, and reporting. Cloud agents 206 can be configured to automatically detect and communicate with the cloud platform 202 upon installation associated with any boiler system, simplifying integration with existing cloud-based data storage, analysis, or reporting applications for a boiler system. In another example application, cloud-based diagnostic applications can monitor the health of respective boiler systems or their associated industrial devices across an entire plant, or across multiple industrial facilities that make up an enterprise. Cloud-based boiler control applications can be used to track boiler efficiency and/or capacity throughout a period of operation. Moreover, cloud based control applications can perform remote decision-making for a controlled boiler system based on data collected in the cloud from the boiler system, and issue control commands to the system via the cloud agent. These industrial cloud-computing applications are only intended to be exemplary, and the systems and methods described herein are not limited to these particular applications. The cloud platform 202 can allow software vendors to provide software as a service, removing the burden of software maintenance, upgrading, and backup from their customers.

Figure 3:
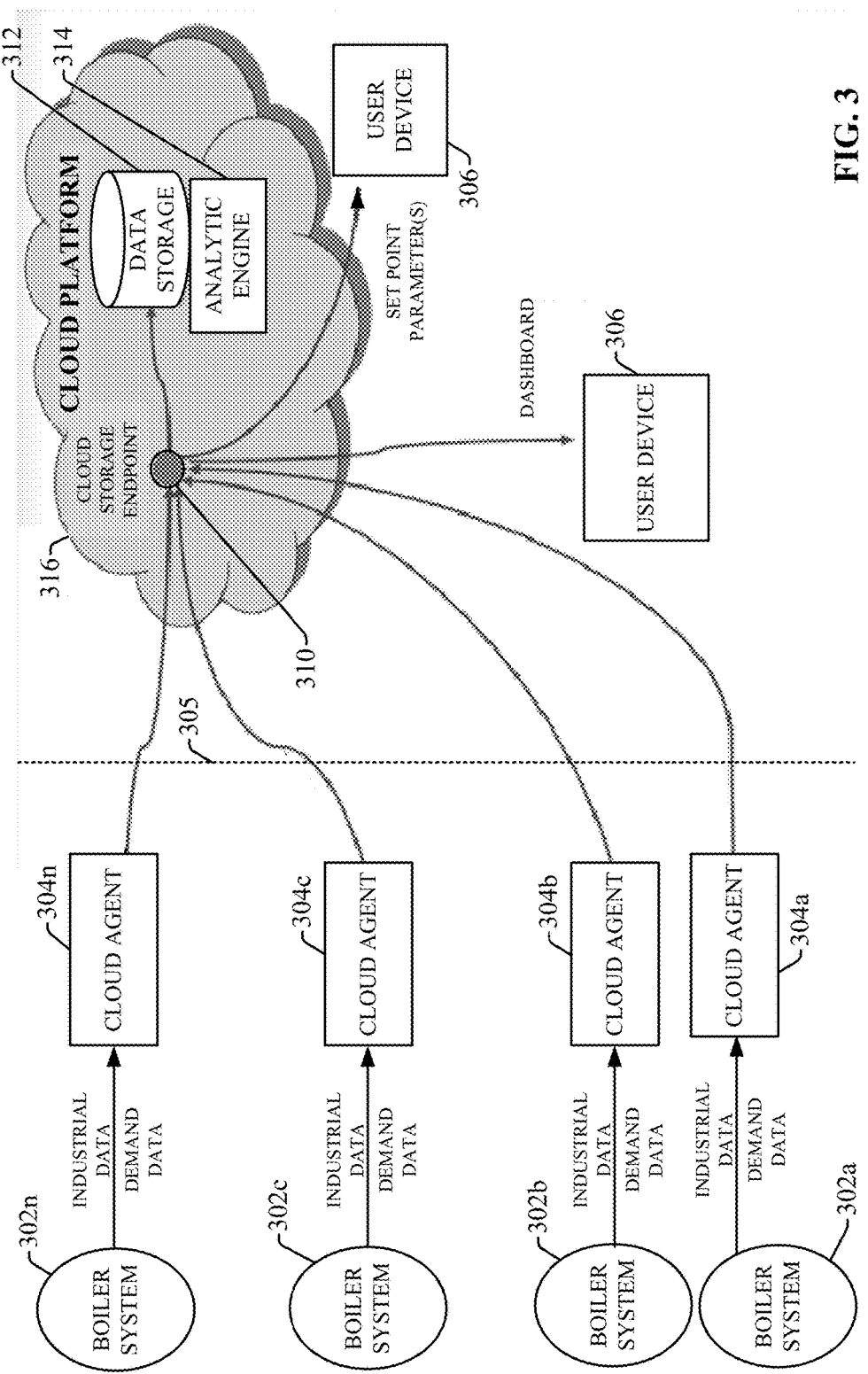
FIG. 3 illustrates an example architecture that uses cloud-based analytics to control boiler operation.

FIG. 3 illustrates an example architecture that uses cloud-based analytics to control boiler operation for the example system 100 illustrated in FIG. 1. In this example system, cloud agents 304a-n (e.g., on-premise cloud agents) are deployed at the remote customer site and used to collect industrial data (e.g., boiler data, operational data, configuration data, etc.) and/or demand data associated with the boiler systems 302a-n. Each of the boiler systems 302a-n can include the boilers 102a-n, the loads 104a-n and/or a plant master control system 106. In one example, the industrial data can be time-series data (e.g., time-series sensor data, etc.).

The cloud agents 304a-n can collect and/or determine the industrial data by monitoring boiler(s) and/or industrial devices included in the boiler systems 302a-n. For example, the cloud agents 304a-n can collect the industrial data by monitoring analog tags associated with boiler(s) included in the boiler systems 302a-n. Analog tags can contain near real-time operational information for the boiler(s) included in the boiler systems 302a-n and/or can indicate alarm statuses. In an non-limiting example of a five-boiler system, this may entail collecting data from approximately 300 analog tags and 700 alarm tags, resulting in collection of approximately 30 Gb of data per month. The cloud agents 304a-n can also collect and/or determine demand data associated with the boiler systems 302a-n.

The cloud agents 304a-n can process the industrial data and/or the demand data for transmission to a cloud platform 316. The cloud agents 304a-n can push the industrial data and/or the demand data to the cloud platform 316 via cloud storage endpoint 310 for storage on cloud-based data storage 312. In an aspect, the cloud agents 304 can convert the industrial data and/or the demand data into a communication format (e.g., a HTTPS format, a SSL format, etc.). In another aspect, a firewall 305 can be implemented between the cloud agents 304a-n and the cloud platform 316. Analytic engine 314 can analyze the industrial data and/or the demand data in view of one or more operational rules to calculate efficiency curves for each boiler in the boiler systems 302a-n. The analytic engine 314 can also determine one or more set point parameters (e.g., SET POINT PARAMETER(S) shown in FIG. 3) for each boiler in the boiler systems 302a-n for a given demand associated with loads associated with the boiler systems 302a-n. The set point parameters can be transmitted to at least one user device 308. In one example, the set point parameters can be associated with a notification. For example, the cloud platform 316 can deliver notifications (e.g., notifications associated with set point parameters) to at least one user device 308. The at least one user device 308 can include, but is not limited to, a desktop computer, a laptop computer, a tablet computer, a smartphone, or another type of user device.

The cloud system can also generate a dashboard (e.g., DASHBOARD shown in FIG. 3) for delivery to the at least one user device 308 that can be used to remotely monitor performance of the boiler systems. The dashboard can leverage selected subsets of the industrial data (e.g., the collected boiler data), as well as results of the analyses performed by analytic engine 314, to display performance information, alarm diagnostics, status information, historical trends for the boiler systems 302a-n and/or other type of data associated with the boiler systems 302a-n. In an aspect, the dashboard can present the one or more set point parameters determined by the analytic engine 314 to a user via the at least one user device 308 (e.g., a user can be advised as to one or more set point parameters to employ in the boiler systems 302a-n via the dashboard presented on the at least one user device 308).

Figure 4:
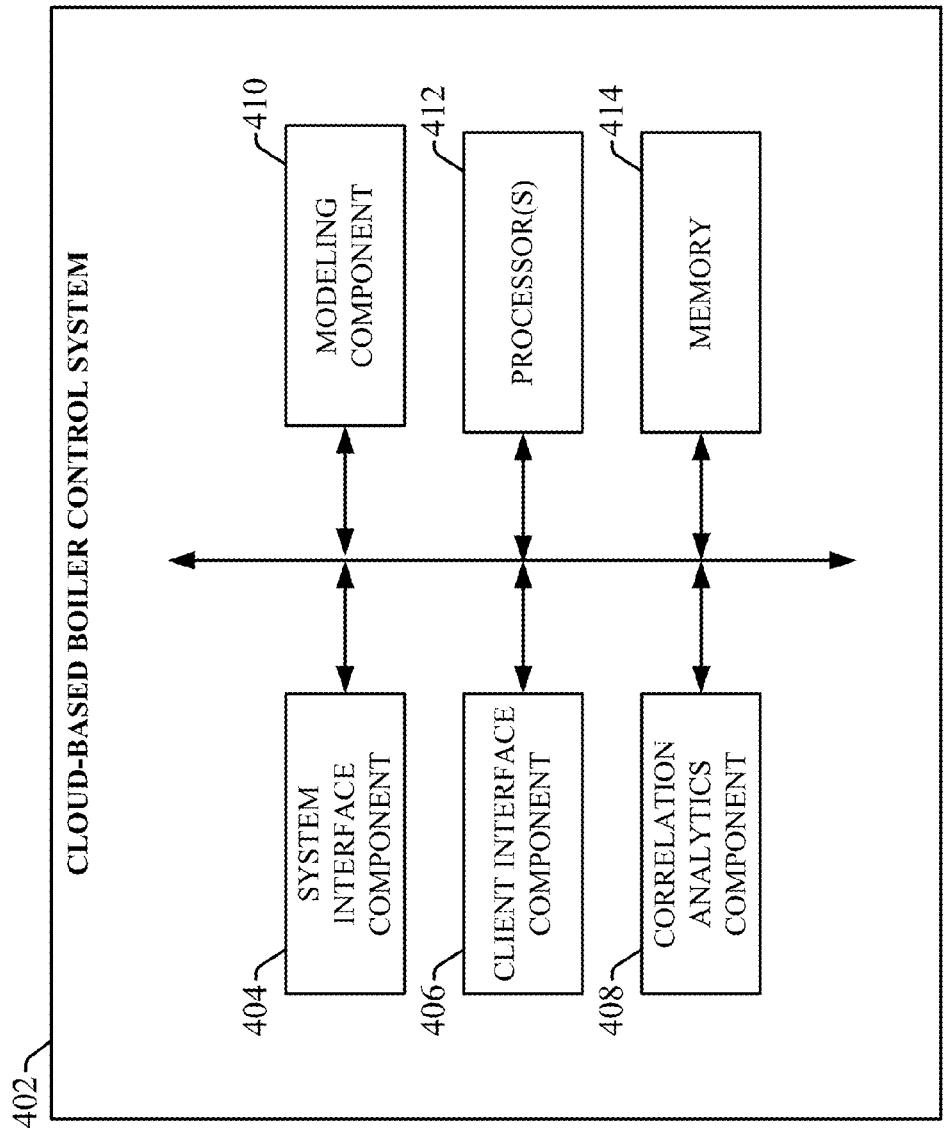
FIG. 4 is a block diagram of an example cloud-based boiler control system.

FIG. 4 is a block diagram of an example cloud-based boiler control system 402 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described. In an aspect, the cloud-based boiler control system 402 can be associated with cloud platform 202 and/or the cloud platform 316 (e.g., analytic engine 314).

Cloud-based boiler control system 402 can include a system interface component 404, a client interface component 406, a correlation analytics component 408, a modeling component 410, one or more processors 412, and memory 414. In various embodiments, one or more of the system interface component 404, client interface component 406, correlation analytics component 408, modeling component 410, the one or more processors 412, and memory 414 can be electrically and/or communicatively coupled to one another to perform one or more of the functions of the cloud-based boiler control system 402. In some embodiments, components 404, 406, 408, and 410 can comprise software instructions stored on memory 414 and executed by processor(s) 412. Cloud-based boiler control system 402 may also interact with other hardware and/or software components not depicted in FIG. 4. For example, processor(s) 412 may interact with one or more external user interface devices, such as a keyboard, a mouse, a display monitor, a touchscreen, or other such interface devices.

System interface component 404 can be configured to receive industrial data from one or more industrial assets comprising an industrial automation system (e.g., a boiler control system). For example, the system interface component 404 can collect industrial data associated with the boilers 102a-n and demand data associated with the set of loads 104a-n (e.g., the boiler systems 204, the boiler systems 302a-n, etc.). The system interface component 404 can also store the industrial data and the demand data on a cloud platform (e.g., the cloud platform 202, the cloud platform 316, etc.). The industrial data and/or the demand data can be received directly from one or more cloud-capable industrial devices having integrated cloud interface capabilities (e.g., industrial devices 208, industrial devices 210, etc.) or via a cloud agent device (e.g., on-premise cloud agents 206, cloud agents 304a-n, etc.) that collects data from one or more industrial assets and ingests the collected data to the cloud platform for storage and processing by the cloud-based boiler control system 402. In an aspect, the system interface component 404 can generate one or more data sets based on the industrial data and the demand data. For example, a data set can include information such as, but not limited to, total load in kilograms (e.g., steam total load), efficiency (e.g., a set of efficiencies for all boilers running at a particular load) and/or running capacity (e.g., a set of capacities for all boilers running at a particular load). In another aspect, the system interface component 404 can receive at least a portion of the industrial data and/or the demand data as a data packet from a cloud agent device associated with one or more boilers.

Client interface component 406 can be configured to exchange data with a client device (e.g., the user device 306) to facilitate user interaction with the cloud-based boiler control system 402. The client device (e.g., the user device 306) can be communicatively connected to a cloud platform (e.g., the cloud platform 202, the cloud platform 316, etc.) associated with the cloud-based boiler control system 402. Data exchanged with the client device via client interface component 406 can include, but is not limited to, a command from the client device to initiate boiler analysis for a given boiler system, recommended set point parameters delivered to the client device by the cloud-based boiler control system 402, information associated with which boilers to operate, a dashboard, user interface screens served to the client device by the cloud-based boiler control system 402, or other such information.

Correlation analytics component 408 can be configured to determine and/or generate at least one set point parameter for the boilers 102a-n based on analysis of the industrial data and/or the demand data. In some embodiments, correlation analytics component 408 can perform an iterative analysis of a boiler behavioral model that links efficiency and capacity associated with the set of boilers 102a-n to yield suitable set point parameters for the boilers 102a-n. Additionally or alternatively, the correlation analytics component 408 can be configured to determine which of the boilers 102a-n to operate based on analysis of the industrial data and/or the demand data. In an aspect, the correlation analytics component 408 can simulate an operating scenario for the boilers 102a-n represented by initial conditions based on the boiler behavioral model. The initial conditions can be random initial conditions. The initial conditions can include load data, boiler identification data, boiler capacity data, system efficiency data, fuel data, cost data and/or other data. In one example, the correlation analytics component 408 can apply a set of operational rules for the operating scenario. Operation rules can include rules such as, but not limited to, use at least two boilers for the operating scenario, worst single boiler for the operating scenario should be able to fulfill critical demand, etc. In another aspect, the correlation analytics component 408 can determine whether the operating scenario for the boilers 102a-n is associated with a maximum efficiency. In one example, the correlation analytics component 408 can modify the initial conditions in response to a determination that the operating scenario for the boilers 102a-n is not associated with the maximum efficiency. In another example, the correlation analytics component 408 can generate the at least one set point parameter in response to a determination that the operating scenario for the boilers 102a-n is associated with the maximum efficiency.

Modeling component 410 can be configured to generate the boiler behavioral model based on the industrial data (e.g., process variable data, operational data, configuration data, or other information collected from the boilers 102a-n) and the demand data. For example, the modeling component 410 can generate a boiler behavioral model for storage on the cloud platform based on analysis of the industrial data and the demand data. The boiler behavioral model can define at least one correlation between efficiency and capacity associated with the set of boilers 102a-n. Modeling component 410 can incrementally refine the boiler behavioral model as new industrial data and/or new demand data is collected to produce a progressively higher fidelity model over time.

The one or more processors 412 can perform one or more of the functions described herein with reference to the systems and/or methods disclosed. Memory 414 can be a computer-readable storage medium storing computer-executable instructions and/or information for performing the functions described herein with reference to the systems and/or methods disclosed.

Figure 5:
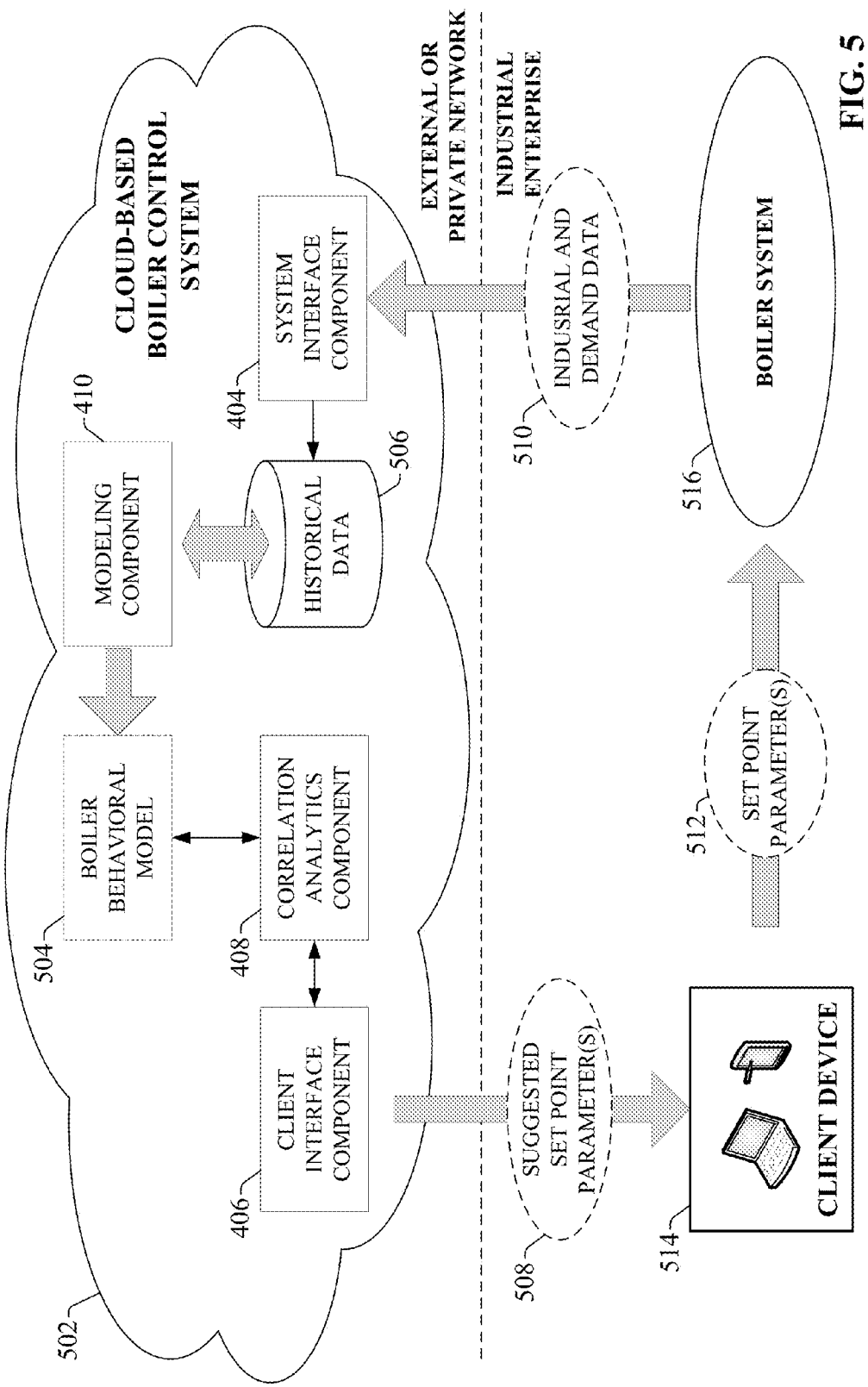
FIG. 5 is a block diagram illustrating an example cloud-based boiler control system in connection with a boiler system.

FIG. 5 is a block diagram illustrating an example cloud-based boiler control system. As described above, the components of the boiler control system can be collectively implemented in a cloud platform 502 (e.g., cloud platform 202, cloud platform 316, etc.) as a service accessible to authorized users (e.g., subscribers to the cloud-based boiler control system). Boiler system 516 is deployed at a plant facility, and comprises one or more boilers (e.g., boilers 102a-n) and one or more loads (e.g., loads 104a-n). Industrial and demand data 510 (e.g., industrial data associated with the boilers 102a-n and demand data associated with the loads 104a-n) is collected from the boiler system 516 and sent to the cloud platform 502 via system interface component 404. The system interface component 404 can maintain a communication channel between the cloud platform 502 and one or more industrial devices or cloud agent devices on a plant floor associated with the boiler system 516. In some embodiments, the industrial and demand data 510 is provided to the system interface component 404 directly by one or more cloud-capable industrial devices associated with the boiler system 516 (e.g., field devices, sensors, industrial controllers, human-machine interfaces, telemetry devices, etc.). In such embodiments, the one or more industrial devices may include an integrated cloud interface component configured to couple the cloud-aware smart device to the system interface component 404 and exchange data with the cloud platform 502. Alternatively, the industrial and demand data 510 can be provided to the cloud platform 502 by one or more cloud agent devices that collect data from the industrial devices and push the data to the cloud platform 502, as will be described in more detail below.

The industrial and demand data 510 can comprise such information as process variable values for a controlled process (e.g., temperatures, pressures, flows, levels, etc.), device configuration information (e.g., configuration parameters, analog output scale factors configured for an industrial controller, etc.), device or system level faults and alarms, machine cycle time information, calculated key performance indicators (KPIs), measured indicators of system performance over time, device or system documentation, device firmware revisions, demand information association with loads, and/or other such information relating to configuration and/or operating characteristics of the boiler system 516. The industrial and demand data 510 is moved to historical data storage 506, which comprises cloud storage allocated to the industrial enterprise that owns boiler system 516 for storage and analysis of respective industrial data and/or demand data.

As noted above, the cloud-based boiler control system (e.g., the cloud platform 502) generates suitable set point parameters for a given boiler application by leveraging a boiler behavioral model 504 built for the boiler system 516 (e.g., a unique boiler system). The boiler behavioral model 504 defines relationships between efficiency and capacity for the boiler system 516, allowing correlation analytics component 408 to determine suitable set point parameters for the boiler system 516. Modeling component 410 generates the boiler behavioral model 504 based on big data analysis of the historical system data (e.g., industrial data and demand data) maintained in historical data storage 506. The big data analysis can discover correlations between efficiency and capacity of the boiler system 516, which can be encoded in the boiler behavioral model 504. Correlation analytics component 408 analyzes the boiler behavioral model 504 to determine suitable set point parameters determined to yield maximum efficiency.

Suggested set point parameters 508 are delivered by the client interface component 406 to a client device 514 associated with an authorized plant employee (e.g., a system designer). The client device 514 can be a user device (e.g., the user device 306). The user of client device 514 may then choose to apply the recommended set point parameters in the boiler system 516 (e.g., a controller of the boiler system 516). For example, the client device 514 may interact with client interface component 406 (and thereby with the cloud platform 502) using a cloud interface application executing on the client device. Client interface component 406 may deliver the suggested set point parameters 508 to the cloud interface application, or to a controller program development environment executing on the client device 514 (which may include an integrated cloud interface to allow the controller development software to interact with both the cloud platform 502 and an industrial controller). Set point parameters 512 can then be downloaded to the boiler system 516 (e.g., a controller of the boiler system 516 using the controller development software).

The cloud-based architecture described herein supports creation of a boiler control system in the cloud platform 502, thereby leveraging cloud-based analytics and big data analysis to facilitate determining the suggested set point parameters 508 for optimum efficiency and/or capacity associated with the boiler system 516. To this end, a virtual link is established between efficiency and capacity associated with one or more boilers of the boiler system 516 based on the boiler behavioral model 504 maintained in the cloud platform 502.

In one or more embodiments, the cloud-based boiler control system can employ an iterative analytical procedure to build the boiler behavioral model 504 and/or determine substantially optimized suggested set point parameters 508 for the boiler system 516. For example, the industrial and demand data 510 associated with the boiler system 516 can be monitored and/or collected in the cloud platform 502 and stored in cloud-based historical data storage 506. The system uses an incremental learning system, whereby the correlation analytics component 408 leverages the boiler behavioral model 504 to correlate efficiency of the boiler system 516 with capacity of the boiler system 516. In some embodiments, the modeling component 410 generates the boiler behavioral model 504 based on historical data collected from devices of the boiler system 516, and may iteratively update the boiler behavioral model 504 over time as new data (e.g., new industrial data and/or new demand data) is gathered from the boiler system 516 and correlated in the cloud platform 502.

This iterative process of generating a simulated process response associated with the boiler system 516 and iteratively modifying set point parameters based on the results comprises a set point parameter optimization loop that gradually converges to the suggested set point parameters 508 determined to yield optimal efficiency and/or capacity associated with the boiler system 516. Once the iterative process has completed (e.g., based on a defined completion condition), the suggested set point parameters 508 can be provided to the client device 514 via the client interface component 406 (e.g., a cloud interface). Therefore, the client interface component 406 can serve as a user interface for the cloud-based boiler control process. In an example where the client interface component 406 also serves as an interface to an industrial controller of the boiler system 516, the client interface component 406 can also generate user prompts offering a user an option to apply the suggested set point parameters 508 to the actual controller of the boiler system 516. In another scenario, the client interface component 406 may allow the suggested set point parameters 508 to be exported to a separate controller programming interface for download to the controller.

The cloud-based boiler control system may also save a record of the suggested set point parameters 508 together with a record of the simulated response data on cloud storage in association with a customer identifier associated with an owner of the boiler system 516, thereby providing a backup of set point parameter settings that can be retrieved at a future time if the controller must be re-configured due to loss of programming, or if a replacement controller requires configuration.

In scenarios in which a user of the client device 514 is actively initiating the boiler control sequence and requesting suggested set point parameters from the cloud-based boiler control system, the client interface component 406 can deliver the suggested set point parameters 508 to the client device 514 upon completion of the iterative set point parameter optimization process (e.g., when the process response satisfies a defined completion criterion). Since the modeling component 410 can update the boiler behavioral model 504 incrementally on the cloud platform 502 as new industrial data and/or new demand data is collected from the boiler system 516, the system may subsequently determine—based on the updated model—that adjustment of the previously determined set point parameters is likely to yield improved system performance, efficiency and/or capacity. Accordingly, in some embodiments, the cloud-based boiler control system may be configured to automatically re-execute the set point parameter optimization sequence, either periodically or in response to defined conditions (e.g., a determination that the boiler behavioral model 504 has evolved by a defined degree relative to the model that yielded the current set point parameters). In such embodiments, the client interface component 406 may deliver a notification to one or more client devices if the correlation analytics component 408 determines that new set point parameters determined based on an automatic re-execution of the boiler control sequence are likely to yield an improved system performance, efficiency and/or capacity relative to the current set point parameters (e.g., by comparing the new simulated process response with the previously saved simulated response generated using the current set point parameters). The client interface component 406 may deliver the suggested set point parameters 508 to the client device 514 together with the notification, or may deliver only the notification to the client device 514, providing a link to a network location at which the new suggested set point parameters 508 can be viewed and/or retrieved. The notification may also include an identification of the particular boiler system to which the new suggested set point parameters 508 are applicable, instructions regarding how to implement the new suggested set point parameters 508 on the industrial controller, etc.

The client interface component 406 may leverage a customer model (not shown) stored on the cloud platform 502 in association with the customer identifier to determine how notifications regarding the suggested set point parameters 508 should be delivered. Example information maintained in the customer model can include a client identifier, client contact information specifying which plant personnel should be notified in the event that new set point parameters are to be recommended, notification preferences specifying how plant personnel should be notified (e.g., email, mobile phone, text message, etc.), preferred technical support personnel to be contacted for support in connection with implementing the set point parameters on the customer's particular industrial controller, service contracts that are active between the customer and the technical support entity, and other such information.

Figure 6:
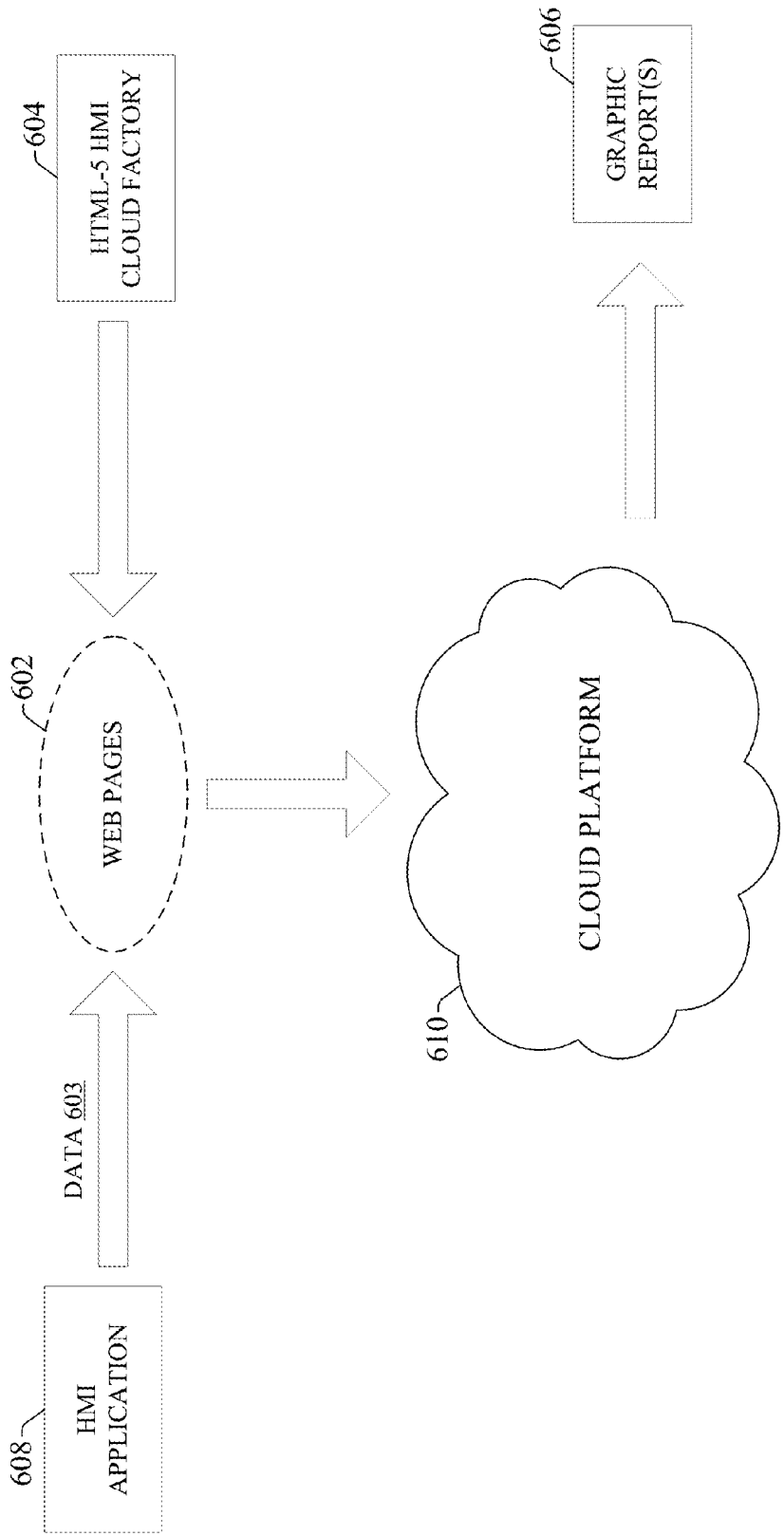
FIG. 6 illustrates an example reporting architecture supported by one or more embodiments of the cloud-based system.

The cloud-based architecture described herein supports a number of reporting features that facilitate remote monitoring of a boiler system. FIG. 6 illustrates an example reporting architecture supported by one or more embodiments of the cloud-based system described herein. In this example, data 603 is exported from an HMI application 608 executing on a plant floor (e.g., an HMI application 608 associated with a boiler system), and web pages 602 (e.g., HTML-5 web pages) are generated based on the exported data 603 using an HMI cloud factory 604. The data 603 can include, but is not limited to, project XML (extensible markup language) files, data tags, data objects, other data, etc. The web pages 602 can comprise one or more graphic reports 606 (e.g., view-only graphical reports) having a similar graphical and data layout to one or more HMI screens of HMI application 608. The web pages 602 are deployed to a website via a cloud platform 610 (e.g., cloud platform 202, cloud platform 316, cloud platform 502, etc.), where the pages can be remotely accessed by a client device (e.g., the user device 306, the client device 514, etc.). In this way, a view-only version of HMI application 608 can be remotely accessed to facilitate remote monitoring of one or more industrial processes. In an aspect, the web pages 602 (e.g., the view-only version of HMI application 608) can receive data from one or more cloud-level databases associated with the cloud platform 610. Therefore, a data pipeline (e.g., an automatically-generated data pipeline) can be implemented between the one or more cloud-level databases (e.g., the one or more cloud-level databases associated with the cloud platform 610) and an HMI web service associated with the web pages 602. For example, the data pipeline can be generated based on HMI tag configuration data (e.g., mapping data). Furthermore, the cloud platform 610 can determine which tags to read from the one or more cloud-level databases and/or which tags to write into the web pages 602 (e.g., a browser-based HMI) throughout the data pipeline.

Figure 7:
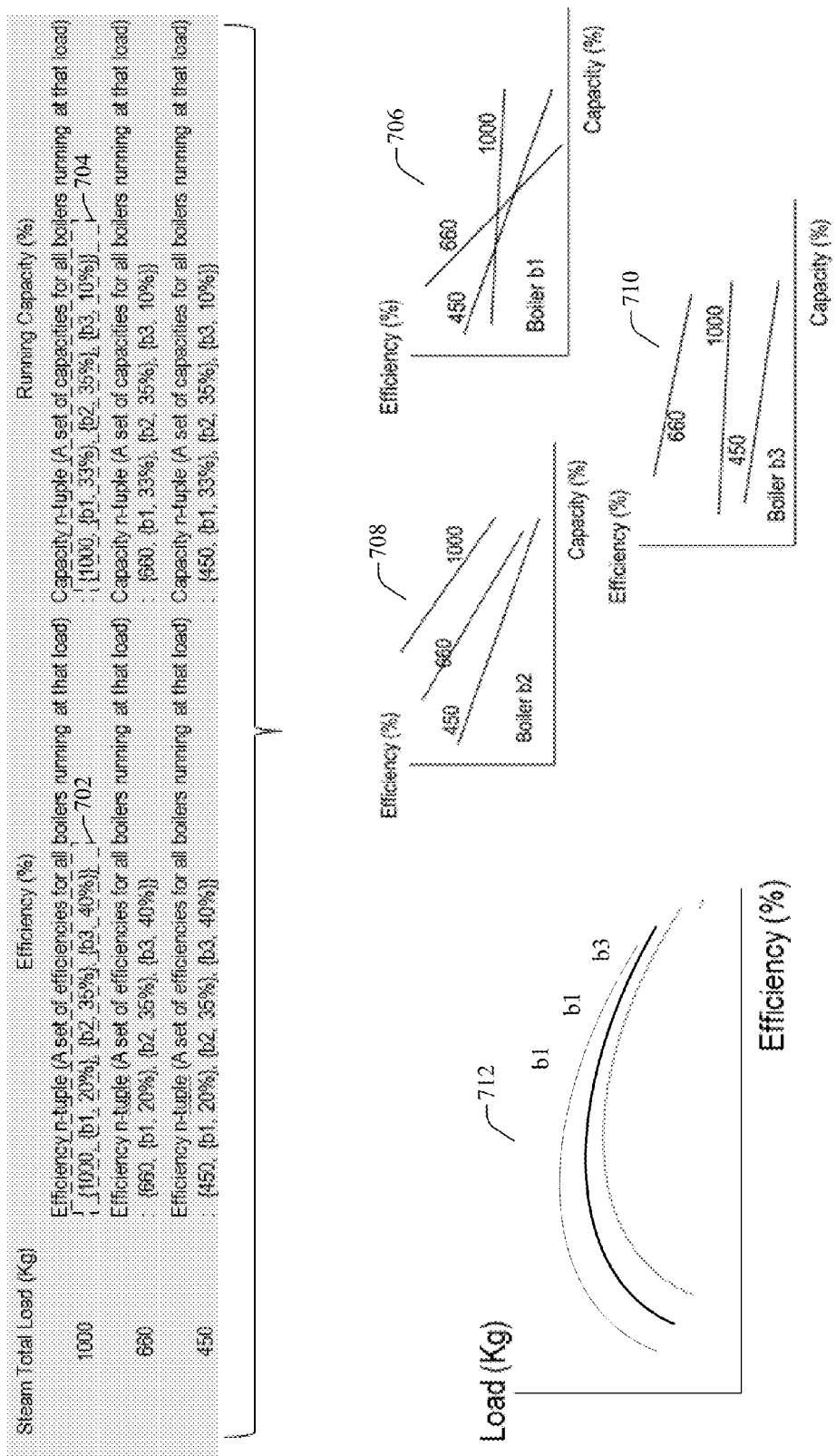
FIG. 7 illustrates an example industrial data in accordance with one or more embodiments described herein.

As illustrated in FIG. 7, the industrial data (e.g., collected time-series data) can be sorted by boiler, capacity, efficiency and/or load. For example, the analytic engine 314 and/or the correlation analytics component 408 can sort the industrial data (e.g., the collected time-series data) by boiler, capacity, efficiency and/or load. For each load of a set of total loads, an efficiency n-tuple representing a set of efficiencies for all boilers running at that load and a capacity n-tuple representing a set of capacities for all boilers running at that load are determined. For example, an efficiency n-tuple 702 can be determined for a 1000 Kg load. In the efficiency n-tuple 702, a first boiler b1 can be associated with 20% efficiency, a second boiler b2 can be associated with 35% efficiency and a third boiler b3 can be associated with 40% efficiency. Additionally, a capacity n-tuple 704 can be determined for the 1000 Kg load. In the a capacity n-tuple 704, the first boiler b1 can be associated with 33% capacity, the second boiler b2 can be associated with 35% capacity and the third boiler b3 can be associated with 10% capacity. Based on these relationships, efficiency curves can be calculated for each boiler. For example, an efficiency curve 706 with respect to capacity can be calculated for the first boiler b1, an efficiency curve 708 with respect to capacity can be calculated for the second boiler b2 and an efficiency curve 710 with respect to capacity can be calculated for the third boiler b3. Additionally or alternatively, an efficiency curve 712 with respect to load can be calculated for the first boiler b1, the second boiler b2 and the third boiler b3. In some embodiments, analytic engine 314 and/or the correlation analytics component 408 can use iterative analysis to determine an optimal efficiency and/or an optimal capacity distribution between the available boilers based on the respective efficiencies, capacities, running costs, fuel consumptions, and/or other factors specific to each boiler.

Figure 8:
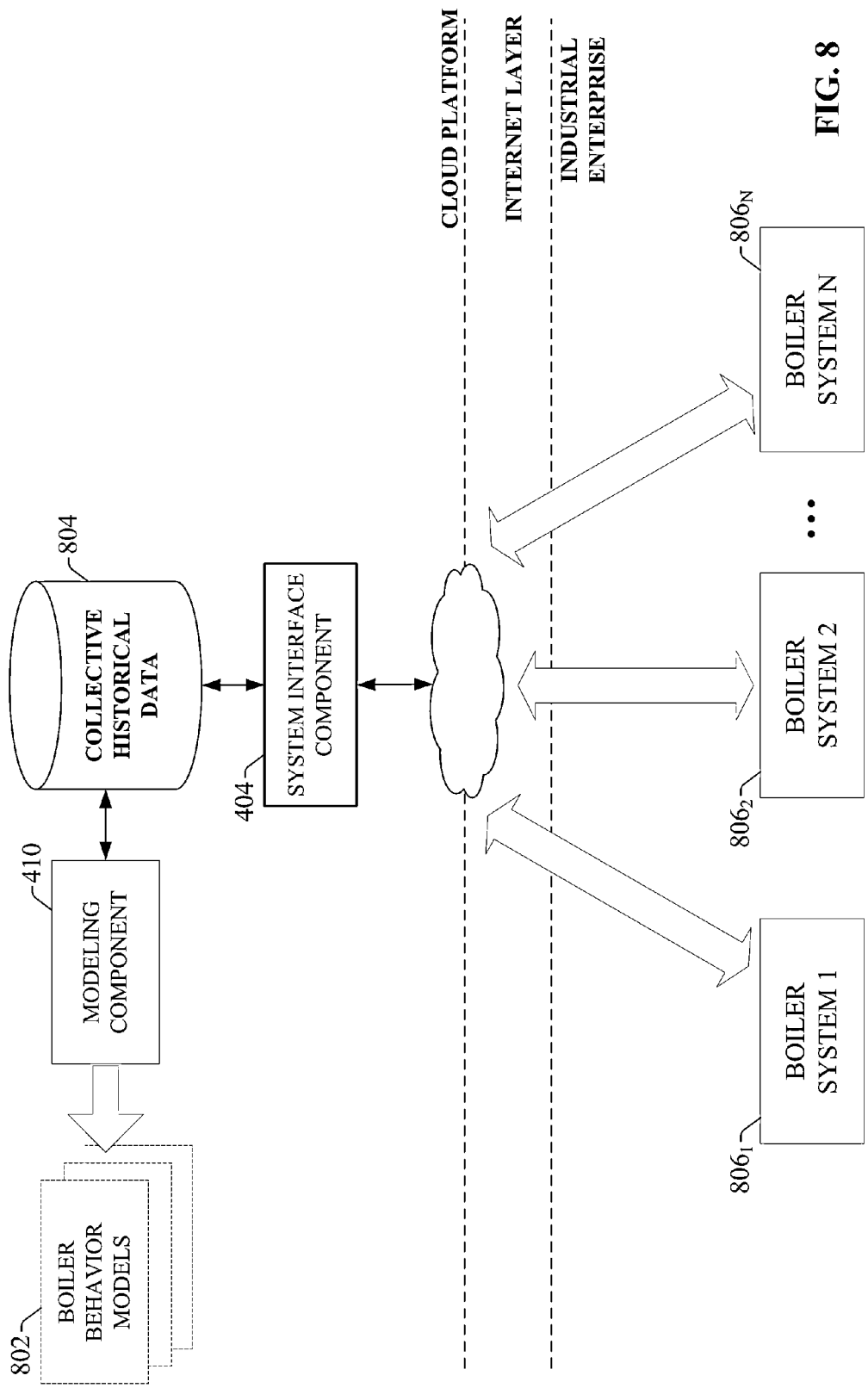
FIG. 8 is a conceptual diagram illustrating collection of data from devices and assets comprising respective different boiler systems for storage in cloud-based collective historical data storage for creation of boiler behavioral models.

Providing the boiler control system on a cloud platform allows set point parameter services to be accessed globally by multiple industrial enterprises or customers from any location. In addition to maintaining individual customer-specific historical data stores for each boiler system, some embodiments of the cloud-based boiler control system can also feed sets of customer data to a collective historical data storage for collective big data analysis in the cloud. As illustrated in FIG. 8, system interface component 404 of the cloud-based boiler control system can collect data from devices and assets comprising respective different boiler systems 806 for storage in cloud-based collective historical data storage 804. In some embodiments, data maintained in collective historical data storage 804 can be collected anonymously with the consent of the respective customers. For example, customers may enter into a service agreement with a technical support entity whereby the customer agrees to have their boiler system and asset data collected by the cloud-based boiler control system in exchange for set point parameter services. Collective historical data storage 804 can organize the collected data according to device type, system type, application type, applicable industry, or other relevant categories.

Modeling component 410 can analyze the resulting multi-industry (e.g., multi-boiler and/or multi-boiler system), multi-customer data to learn industry-specific, device-specific, machine-specific, and/or application-specific trends, behavior patterns, thresholds, or other information that can be used to characterize relationships between efficiency and capacity of boilers across different types of systems, equipment, and devices. In such embodiments, modeling component 410 can perform big data analysis on the multi-enterprise data maintained in collective historical data storage to learn and characterize operational trends or patterns as a function of industry type, application type, equipment in use, industrial asset configuration, device configuration settings, or other such variables. The modeling component 410 can then use results of this analysis to build application-specific boiler behavior models 802 based on an assessment of a particular customer's control system.

For example, it may be known that a particular boiler asset in use at a given industrial facility (e.g., a boiler, a machine, a unit of equipment, a controller, a drive, etc.) is used across different industries for different types of boiler applications. Accordingly, modeling component 410 can identify a subset of the global data stored in collective historical data storage 804 relating to the asset or asset type, and perform analysis on this subset of data to determine how the asset or asset type performs over time for different set point parameters. For example, the modeling component 410 may monitor common industrial data of similar boiler systems, and record the set point parameters used for the respective boiler systems. By collectively analyzing this multi-enterprise data, the modeling component 410 can refine the boiler behavioral models 802 to more accurately link efficiency and capacity associated with a boiler system. By leveraging a large amount of historical data gathered from many different boiler systems, modeling component 410 can learn common operating characteristics of many diverse configurations of boiler assets using different set point parameters at a high degree of granularity and under many different operating contexts.

In some embodiments, modeling component 410 can compare operational behavior of similar boiler applications across different device hardware platform or software configuration settings, and make a determination regarding which combination of hardware, configuration settings, and/or set point parameters yield preferred operational performance. Moreover, modeling component 410 can compare data across different verticals to determine whether system configurations used at one vertical could beneficially be packaged and implemented for another vertical. Some embodiments of the boiler control system can use such determinations as the basis for customer-specific recommendations. In general, collective historical data storage 804, together with modeling component 410, can serve as a repository for knowledge capture and best practices for a wide range of boilers, industries, industrial applications, and device combinations.

It is to be appreciated that any suitable technique can be used to migrate data from the device-level industrial systems on the plant floor to historical data storage 804. In this regard, the boiler behavior modeling and boiler analytics performed by the modeling component 410 and the correlation analytics component 408 are agnostic with regard to the specific technology used to ingest plant floor data in the cloud platform. Thus, the analysis of the collected industrial data maintained in historical data storage 804 is decoupled from the particular technologies used to move the industrial data and/or demand data from the plant floor to the cloud platform.

Figure 9:
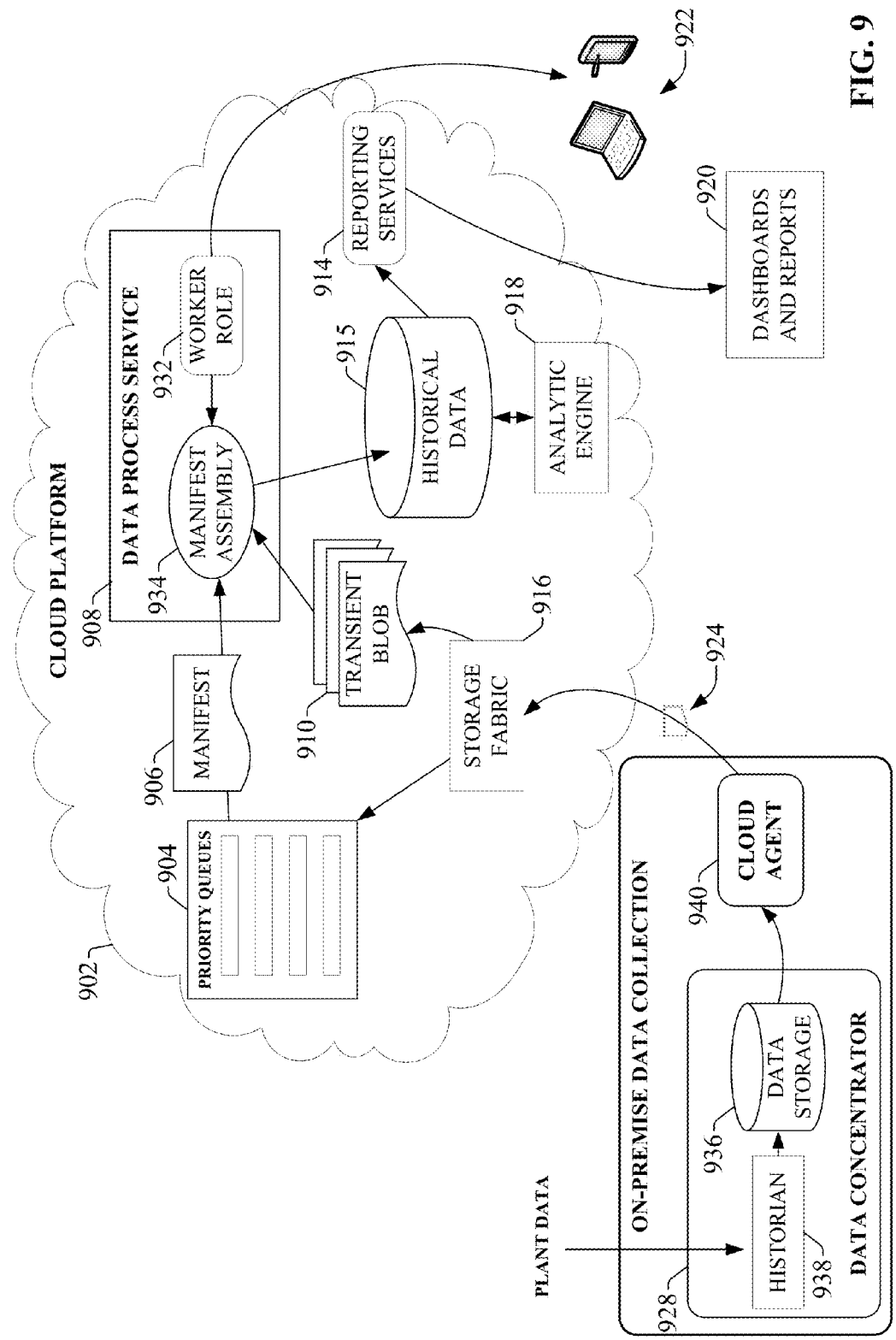
FIG. 9 is a diagram illustrating a system that leverages an agent-based cloud infrastructure to provide data collection and processing services.

In a non-limiting example, data from boiler devices and systems can be provided to a cloud platform 902 (e.g., cloud platform 202, cloud platform 316, cloud platform 502, etc.) for storage and analysis using cloud agent devices in some embodiments. FIG. 9 is an overview of a system that leverages an agent-based cloud infrastructure to provide data collection and processing services (such as the boiler control services described herein) to manufacturing sites associated with boiler systems. This system can provide remote collection and analysis services in connection with remote boiler control.

In the example illustrated in FIG. 9 a data concentrator 928 collects plant data from one or more industrial assets (e.g., data associated with one or more boilers and/or one or more loads) at a plant facility. These industrial assets can include industrial controllers that monitor and/or control industrial I/O devices, data servers and historians, remote I/O interfaces that remotely interface groups of I/O devices to one or more of the industrial controllers, boilers, loads, other industrial machines, other such assets, etc. For example, data concentrator 928 can monitor one or more controller tags defined in a tag archive and store data in local data storage 936 (e.g., a local structured query language, or SQL, server) associated with a historian 938. The collected data can include historical data (e.g., alarm history, status history, trend data, etc.), live data values read from the industrial assets, sensor data associated with the industrial assets, alarm data generated by the industrial assets and/or other types of data.

An on-premise cloud agent 940 is configured to collect the live or historical data from the industrial assets, either directly or by accessing data storage 936 associated with data concentrator 928. Cloud agent 940 can execute on any suitable hardware platform (e.g., a server, a LINUX box, etc.), and acts as a generic gateway that collects data items from the various industrial assets on the plant network and packages the collected data according to a generic, uniform data packaging schema used to move the on-premise data to the cloud platform 902. Cloud agent 940 provides a software mechanism to dynamically link on-premise-to-cloud gateways. Cloud agent 940 provides an expandable data type schema that allows new data types to be added without the need to redeploy the monitoring system to the cloud.

During data collection, the cloud agent 940 can intelligently sort and organize the data based on defined criteria, including but not limited to time of occurrence and/or user-defined priorities. Cloud agent 940 can be, for example, a service (e.g., a Windows service) that periodically collects and transmits serialized and compressed data into the cloud domain using standard web services over HTTPS/SSL.

FIG. 9 depicts data concentrator 928 as the data source for cloud agent 940. This configuration can be useful if there are a large number of data points to monitor, since the data concentrator can 928 can link multiple industrial devices or other data sources to a single cloud agent 940. However, some embodiments of cloud agent 940 can collect data directly from the industrial assets themselves; e.g., through a common industrial protocol link, or through middleware applications such as OPC clients.

Figure 10:
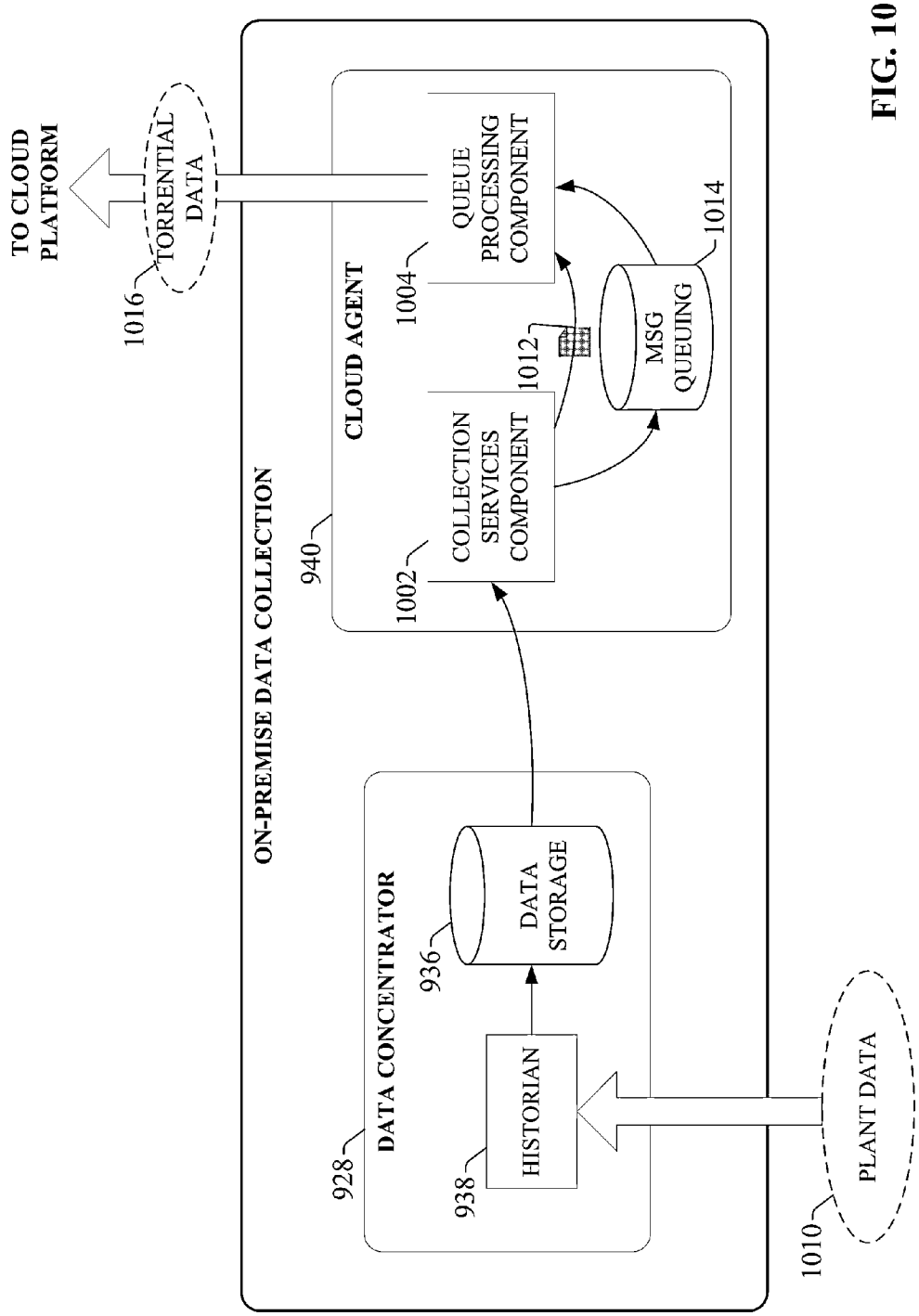
FIG. 10 is a block diagram illustrating on-premise data collection.

Cloud agent functionality is illustrated in more detail with reference to FIG. 10. On-premise data collection is enabled by a collection of services that function as a virtual support engineer for processing data. Data concentrator 928 and cloud agent 940 respectively implement two main functions associated with data collection—data concentration using a historian 938 and associated data storage 936 (e.g., an SQL server), and cloud data enablement using cloud agent services executed by cloud agent 940. As noted above, plant data 1010 (e.g., industrial data and/or demand data) is collected by data concentrator 928 at the plant facility. In an example scenario, plant data 1010 may comprise time series sensor data made up of thousands of data points updated at a rate of less than a second.

Collection services component 1002 of cloud agent 940 implements collection services that collect device data, either from data concentrator's associated data storage (e.g., via an SQL query) or directly from the devices themselves via a common industrial protocol (CIP) link or other suitable communication protocol. For example, to obtain data from data concentrator 928, collection services component 1002 may periodically run a data extraction query (e.g., an SQL query) to extract data from data storage 936 associated with data concentrator 928. Collection services component 1002 can then compress the data and store the data in a compressed data file 1012. Queue processing services executed by queue processing component 1004 can then read the compressed data file 1012 and reference a message queuing database 1014, which maintains and manage customer-specific data collection configuration information, as well as information relating to the customer's subscription to the cloud platform and associated cloud services. Based on configuration information in the message queuing database 1014, queue processing component 1004 packages the compressed data file 1012 into a data packet and pushes the data packet to the cloud platform. In some embodiments, the cloud agent 940 can support injecting data packets as torrential data 1016.

Message queuing database 1014 can include site-specific information identifying the data items to be collected (e.g., data tag identifiers), user-defined processing priorities for the data tags, firewall settings that allow cloud agent 940 to communicate with the cloud platform through a plant firewall, and other such configuration information. Configuration information in message queuing database 1014 instructs cloud agent 940 how to communicate with the identified data tags and with the remote data collection services on the cloud platform.

In addition to collection and migration of data, one or more embodiments of cloud agent 940 can also perform local analytics on the data prior to moving the data to the cloud platform. This can comprise substantially any type of pre-processing or data refinement that may facilitate efficient transfer of the data to the cloud, prepare the data for enhanced analysis in the cloud, reduce the amount of cloud storage required to store the data, or other such benefits. For example, cloud agent 940 may be configured to compress the collected data using any suitable data compression algorithm prior to migrating the data to the cloud platform. This can include detection and deletion of redundant data bits, truncation of precision bits, or other suitable compression operations. In another example, cloud agent 940 may be configured to aggregate data by combining related data from multiple sources. For example, data from multiple sensors measuring related aspects of an automation system (e.g., a boiler system) can be identified and aggregated into a single cloud upload packet by cloud agent 940. Cloud agent 940 may also encrypt sensitive data prior to upload to the cloud. In yet another example, cloud agent 940 may filter the data according to any specified filtering criterion (e.g., filtering criteria defined in a filtering profile stored on the cloud agent). For example, defined filtering criteria may specify that pressure values exceeding a defined setpoint are to be filtered out prior to uploading the pressure values to the cloud.

In some embodiments, cloud agent 940 may also transform a specified subset of the industrial data and/or demand data from a first format to a second format in accordance with a requirement of a cloud-based analysis application. For example, a cloud-based reporting application may require measured values in ASCII format. Accordingly, cloud agent 940 can convert a selected subset of the gathered data (e.g., the industrial data and/or the demand data) from floating point format to ASCII prior to pushing the data to the cloud platform for storage and processing. Converting the raw data at the industrial device before uploading to the cloud, rather than requiring this transformation to be performed on the cloud, can reduce the amount of processing load on the cloud side.

Cloud agent 940 may also associate metadata with selected subsets of the data prior to migration to the cloud, thereby contextualizing the data within the industrial environment (e.g., boiler system environment). For example, cloud agent 940 can tag selected subsets of the data (e.g., the industrial data and/or the demand data) with a time indicator specifying a time at which the data was generated, a quality indicator, boiler identifier, a production area indicator specifying a production area within the industrial enterprise from which the data was collected, a machine or process state indicator specifying a state of a machine or process at the time the data was generated, a personnel identifier specifying an employee on duty at the time the data was generated, or other such contextual metadata. In this way, cloud agent 940 can perform layered processing of the collected data to generate meta-level knowledge that can subsequently be leveraged by cloud-based analysis tools to facilitate enhanced analysis of the data in view of a larger plant context.

To ensure secure outbound traffic to the cloud, one or more embodiments of cloud agent 940 can support HTTPS/SSL, certificate authority enabled transmission, and/or unique identity using MAC addresses. Cloud agent 940 can also support store-and-forward capability to ensure data is not lost if the agent becomes disconnected from the cloud.

Returning now to FIG. 9, cloud agent 940 sends compressed data packet 924 to the cloud-based data collection and monitoring system on cloud platform 902 via a cloud storage fabric 916. The data packet 924 conveys parameters and data (compressed and serialized) used by the cloud-side services to reconstruct the domain data structure in the cloud using auxiliary tenant-level manifests. The cloud services direct remote storage of the received data into preconditioned transient blobs 910. The cloud platform 902 can use agent reasoning and collective bargain features to determine a data storage locale.

Through the configuration interface provided by cloud agent 940, users at the plant facility can dynamically configure one or more priority queues 904 that respectively define how the data packets are processed in the cloud platform 902. For example, separate queues may be defined for alarms, live data, and historical data, allowing data to be organized according to these data types. The historical data queue can relate to time-series records, which can be accessed through an application programming interface (API) (e.g., an SQL API or other suitable API). The alarms queue can relate to abnormal situations, where the alarm data can also be accessed through the API. This alarms queue can comprise multiple queues associated with different alarm priorities, to allow for individual processing for different alarms having different levels of criticality. In some embodiments, servers, controllers, switches, etc., can be monitored using a number of protocols, and at a certain point (e.g., at the end of a monitoring cycle) alarms can be queued and cloud agent 940 can send the alarms to the cloud. Alarms can be reactive (e.g., alarms that trigger when a motor fails, when a CPU crashes, when an interlock is tripped, etc.) or proactive (e.g., a monitoring system may track consumables on a machine and generate an alarm when time to reorder, monitor cycle counts on a machine and generate an alarm when to schedule preventative maintenance, generate an alarm when temperatures fall outside defined bandwidths, send a notification when a computer's memory is 80% full, etc.).

The live data queue can relate to substantially real-time monitored data, such as current temperatures, current pressures, current levels, current flow, etc. The live data values can also be accessed through the API (e.g., a SQL API). The queues described above are not intended to be limiting, and it is to be appreciated that other types of priority queues can be defined according to the needs of the end user. For example, queues may be defined for specific devices or device types (e.g., motor drives) for uploading of device parameter and/or performance data.

In some embodiments, cloud agent 940 can allow the user to define these priority queues 904 from the on-site location and to define how data in each queue is handled. For example, the user can define, for each queue, an upload frequency, a priority level (e.g., which data queues should take processing priority over other data queues), identities of cloud partitions or databases in which data from the respective queues should be stored, and other such information. In an example scenario, the live data queue may be defined to process live data values that are to be used by a remote operator interface application to view substantially real-time data from the plant facility, while historical data queue may be used to process historian data for archival storage in a historical database on cloud storage (e.g., historical data storage 915). Accordingly, the live data queue may be assigned a higher priority relative to the historical data queue, since data in the live data queue is more time-critical than data in the historical queue.

Through cloud agent 940, users can assign priorities to respective data tags or tag groups at the customer site. These priority assignments can be stored in the message queuing database 1014 of the cloud agent 940. Accordingly, when queue processing component 1004 packages the collected data to be moved to the cloud platform, the collected data items can be packaged into data packets according to priority (as defined in message queuing database 1014), and the respective data packet headers populated with the appropriate priority level. If access to the cloud is unavailable, data will continue to be collected by collection services component 1002 and stored locally on the cloud agent in local storage associated with collections services. When communication to the cloud is restored, the stored data will be forwarded to cloud storage. Queue processing services can also encrypt and send storage account keys to the cloud platform for user verification.

Figure 11:
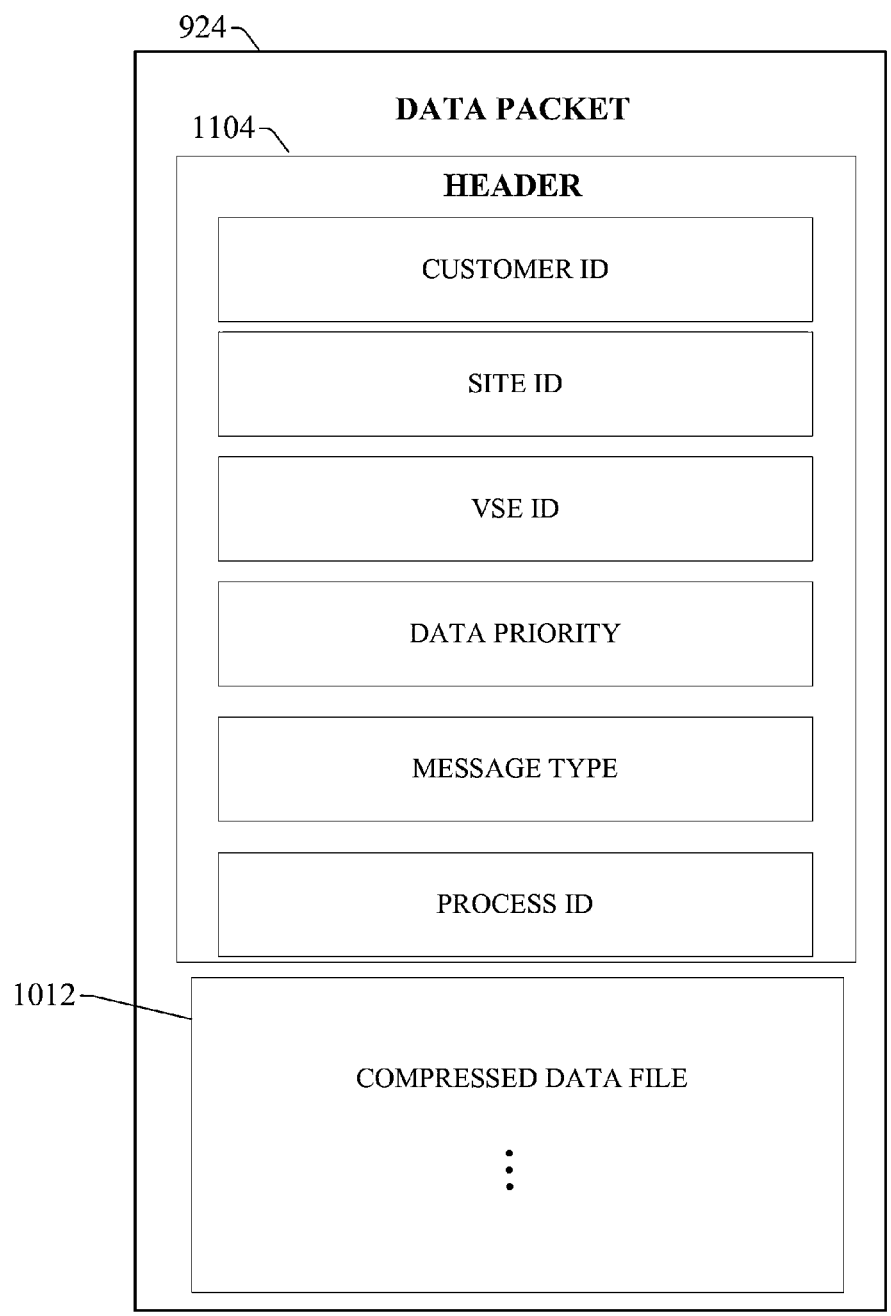
FIG. 11 is a diagram of an example compressed data packet.

Message queuing services implemented by queue processing component 1004 of cloud agent 940 encapsulates or packages the compressed data file by adding customer-specific header information to yield a compressed data packed (e.g., compressed data packet 924 of FIG. 9). For example, the queue processing component 1004 can access a message queuing database (e.g., message queuing database 1014 of FIG. 10), which stores customer site configuration information and manages the customer's subscription to the cloud platform services. The message queuing database 1014 may include such information as a customer identifier associated with the customer entity associated with the industrial enterprise (e.g., the boiler system), a boiler identifier, a site identifier associated with a particular plant facility from which the data was collected, a priority to be assigned to the data (which may be dependent on the type of information being sent; e.g., alarm data, historical data, live operational data, etc.), information required to facilitate connection to the customer's particular cloud fabric, or other such information. The information included in the header is based on this customer-specific information maintained in the message queuing database. An example compressed data packet is illustrated in FIG. 11. As shown, the cloud agent's message queuing services add a header 1104 to compressed data file 1012 to yield the compressed data packet 924. The header 1104 contains customer-specific data read from message queuing database 1014. For example, header 1104 can include a unique customer identifier, a site identifier representing a particular plant facility, a boiler identifier, a virtual support engineer identifier, a data priority for the data (e.g., the industrial data and/or the demand data) in the compressed data file 1012, a message type, and a process identifier that specifies a particular manifest application on the cloud platform that should be used to process the data on the cloud side. Packaging the data (e.g., the industrial data and/or the demand data) in this way can allow data from diverse data sources to be packaged together using a uniform, generic data packaging schema so that the data can be moved to the cloud infrastructure.

When cloud agent 940 sends a data packet to the cloud-based remote processing service, the service reads the packet's header information to determine a priority assigned to the data (e.g., as defined in a data priority field of the data packet) and sends the data packet (or the compressed data therein) to a selected one of the user defined priority queues 904 based on the priority. On the other side of the priority queues 904, a data process service 908 processes data in the respective priority queues 904 according to the predefined processing definitions. The data processing service includes a worker role 932 that determines how the queued data is to be processed based on manifests (e.g., system manifests, tag manifests, and metric manifests) stored in a customer-specific manifest assembly 934. Manifests define and implement customer-specific capabilities, applications, and preferences for processing collected data in the cloud. Manifests can be dynamically uploaded by a user at the plant facility through cloud agent 940, which facilitates dynamic extension of cloud computing capability.

For example, if new data points are to be added to the data collection system that require creation of a new data queue, the user can interact with cloud agent 940 to configure a new manifest for the new queue, the manifest defining such aspects as processing priority for the data, upload frequency for the data, where the data is to be routed or stored within cloud storage, and other such information. Cloud agent 940 can then upload the new manifest 906 together with the data (or independently of the data). The new manifest 906 is then added to the customer's manifest assembly 934 with the other manifests defined for the customer, so that worker role 932 can leverage the new manifest 906 to determine how data in the new queue is to be processed. This new manifest 906 need only be uploaded to the cloud-based remote monitoring service once. Thereafter, data placed in the new priority queue will be processed by worker role 932 according to the new manifest 906 stored in the customer's manifest assembly 934. For example, the manifest may define where the data is to be stored within cloud storage (e.g., historical data storage 915, an Alarms and Live Data database, etc.), and whether processing of the new data queue is to take priority over other data queues. In some embodiments, the manifest assembly 934 may only accept a new manifest if the manifest is accompanied by a unique key associated with the client.

Once the cloud-based infrastructure has processed and stored the data provided by cloud agent 940 according to the techniques described above, the data can be made accessible to client devices 922 (e.g., user devices) for viewing. Data analysis on the cloud platform 902 can provide a set of web-based and browser enabled technologies for retrieving, directing, and uncompressing the data from the cloud platform 902 to the client devices 922. To this end, reporting services 914 can deliver data in cloud storage (e.g., from historical data storage 915, or controller gain values generated by correlation analytics component 408) to the client devices 922 in a defined format. For example, reporting services 914 can leverage collected data stored in the cloud repository to provide remote operator interfaces to client devices 922 over the Internet. An analytic engine 918 executing on the cloud platform 902—and which may include correlation analytics component 408—can also perform various types of analysis on the data stored in big data storage 912 and provide results to client devices 922.

Figure 12:
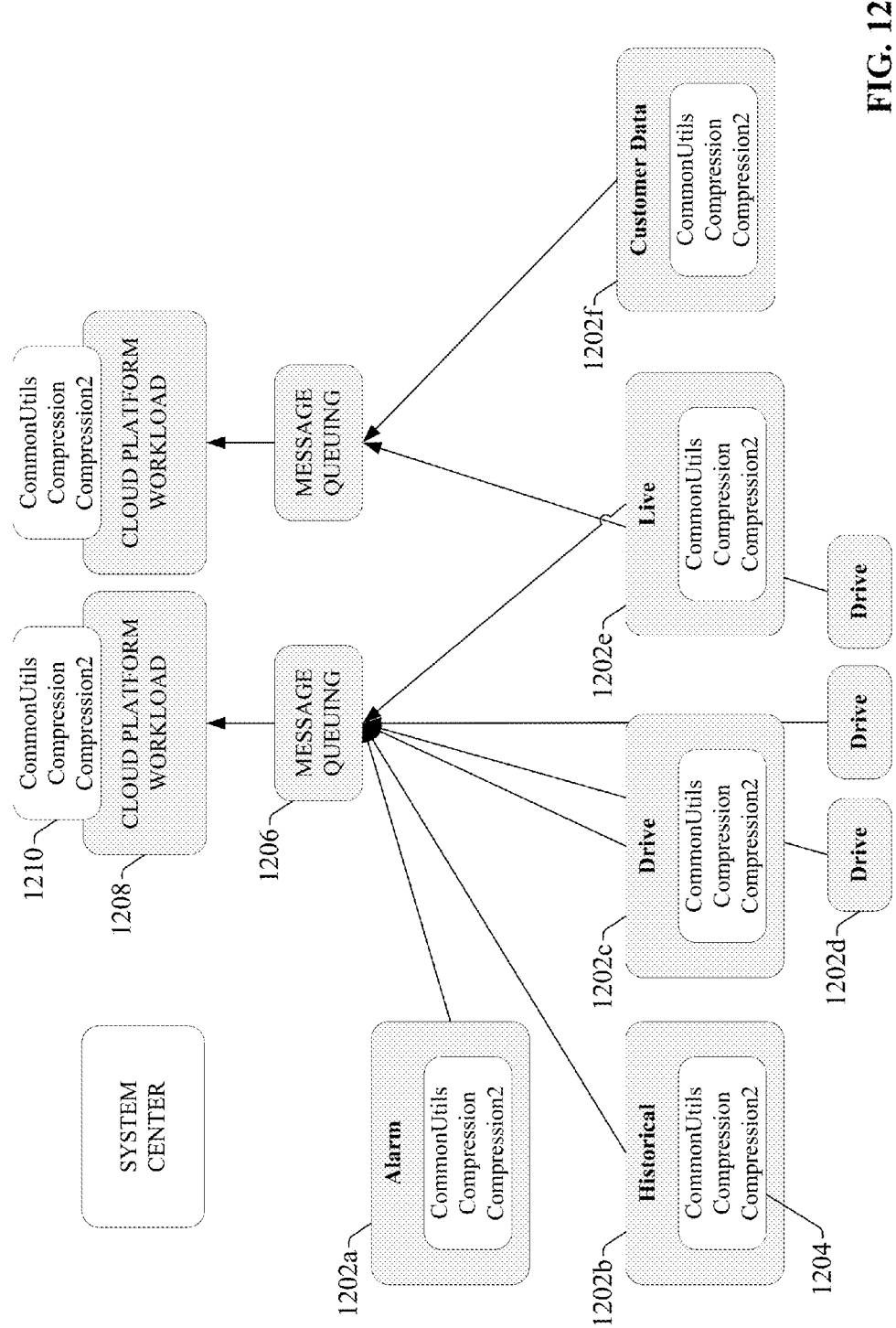
FIG. 12 is a block diagram of an example agent architecture for collection of data from on-premise industrial devices.

FIG. 12 is a block diagram illustrating an example agent architecture for collection of data (e.g., the industrial data and/or the demand data) from on-premise industrial devices according to one or more embodiments. In this example, data is collected from a number of devices and applications 1202 at the customer site, including an alarm database 1202*a*, data historian 1202*b*, motor drives 1202*c* and 1202*d*, live data server 1202*e*, and a customer database 1202*f*. Although these data sources comprise a diverse, heterogeneous collection of devices and applications, collection and pre-processing of data from these sources can be carried out by generic services 1204 (e.g., service libraries). Generic services 1204 can include utilities for identifying the data locations (e.g., devices, applications, tags, registers, etc.) from which data (e.g., the industrial data and/or the demand data) is to be retrieved, utilities for compressing or otherwise pre-processing the data, and providing the data to the message queuing layers 1206 of the cloud agents. The workload services 1208 of the cloud agents can also utilize generic services 1210 to encapsulate and send the data to the cloud fabric. The message queuing layers 1206 and workload services 1208 make up the backbone of the decoupled agent architecture.

FIGS. 13-16 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

Figure 13:
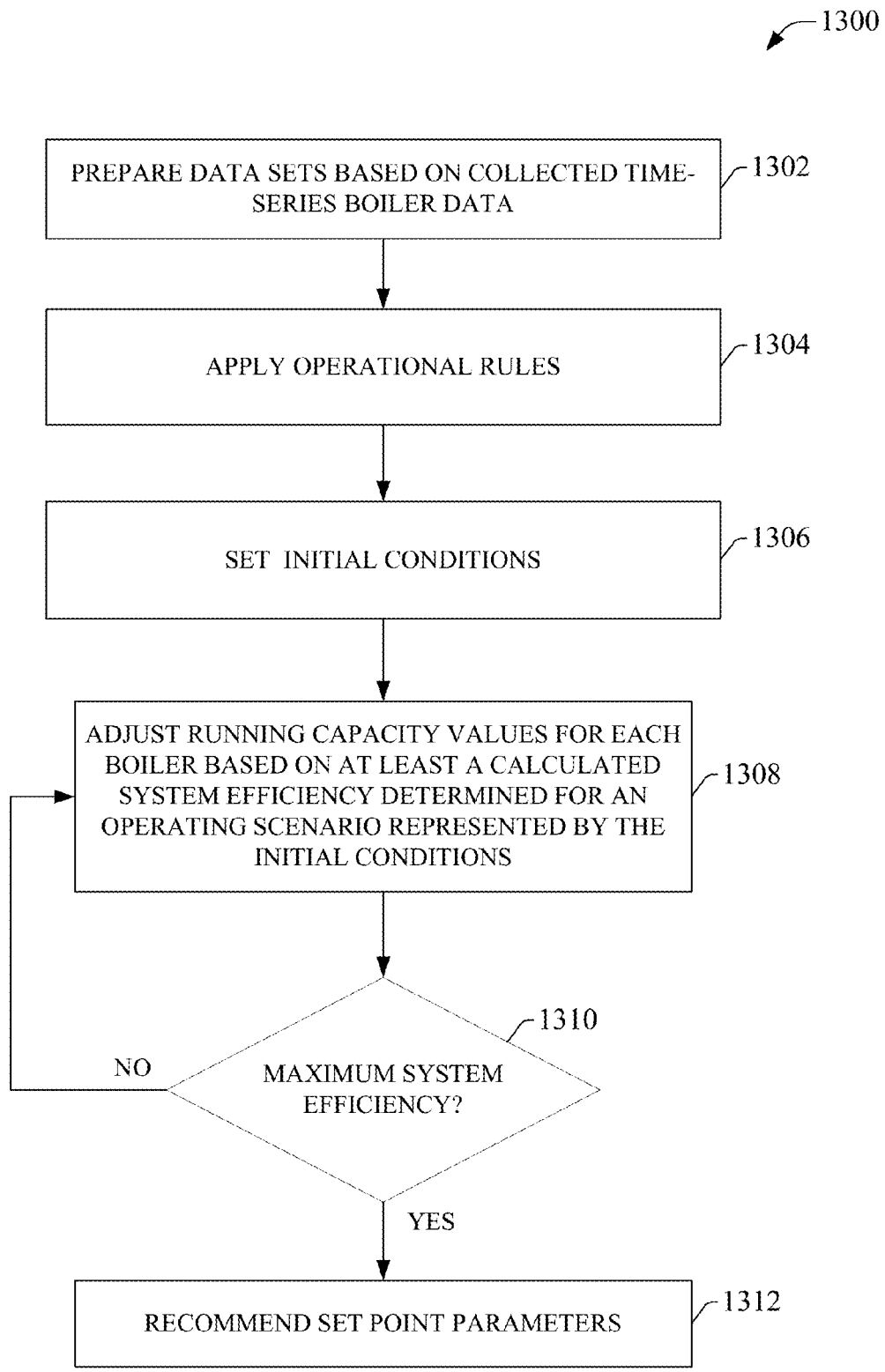
FIG. 13 is a flowchart of an example methodology for determining recommended set point capacities for respective boilers.

FIG. 13 illustrates an example methodology 1300 for determining recommended set point capacities for each boiler. In an aspect, methodology 1300 can be associated with analytic engine 314 and/or cloud-based boiler control system 402. Initially, at 1302, data sets are prepared based on collected time-series boiler data. For example, data sets can be prepared based on industrial data associated with one or more boilers and/or demand data associated with one or more loads.

At 1304, operational rules are applied. Operational rules can include, for example, user-defined restrictions, requirements on operation of one or more of the boilers, etc. Operational rules can act as constraints on how capacity is shared between the boilers.

At 1306, initial conditions are set. The initial conditions can include an initial running capacity (%) for each boiler to satisfy a given load. For example, initial conditions can include load data (e.g., fixed load data), capacity data associated with a particular boiler, system efficiency data, fuel data (e.g., fixed fuel data), cost data (e.g., fixed cost data) and/or other data.

At 1308, running capacity values for each boiler are adjusted based on at least a calculated system efficiency determined for an operating scenario represented by the initial conditions. In an aspect, running capacity values for each boiler can additionally or alternatively be adjusted based on estimated fuel consumption for each boiler and/or a cost of running each boiler under the initial conditions.

At 1310, a determination is made regarding whether the calculated system efficiency represents maximum system efficiency. If the system efficiency is not determined to represent maximum system efficiency, the methodology 1300 returns to 1308, and the boiler running capacity share is adjusted again based on the previously determined efficiency. Steps 1308 and 1310 are reiterated until a maximum system efficiency is determined at 1310.

At 1312, the respective boiler set point parameters corresponding to the determined maximum system efficiency is then recommended. For example, the respective boiler set point capacities corresponding to the determined maximum system efficiency can be provided to a user device and/or a controller for a boiler system.

Figure 14:
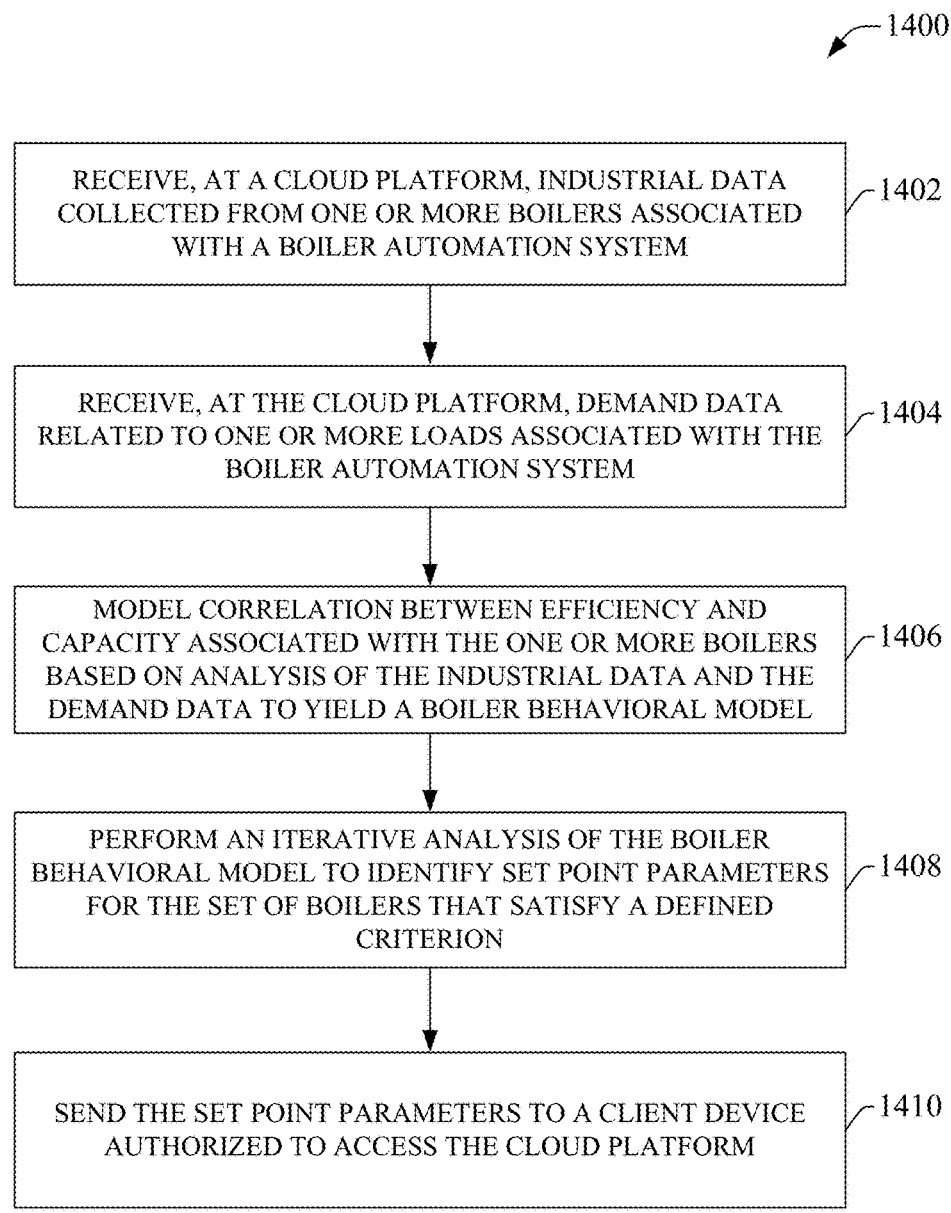
FIG. 14 is a flowchart of an example methodology for determining set point parameters using a cloud-based boiler control system.

FIG. 14 illustrates an example methodology 1400 for determining set point parameters for a set of boilers using a cloud-based boiler control system. Initially, at 1402, industrial data collected from one or more boilers associated with a boiler automation system is received at a cloud platform. The industrial data can be provided to the cloud platform directly by one or more cloud-capable industrial devices associated with the one or more boilers and/or can be provided to the cloud platform by one or more cloud agent devices that collect data from the industrial devices and push the data to the cloud platform. The industrial data can comprise such information as process variable values for a controlled process (e.g., temperatures, pressures, flows, levels, etc.), device configuration information (e.g., configuration parameters, analog output scale factors configured for an industrial controller, etc.), device or system level faults and alarms, machine cycle time information, calculated KPIs, measured indicators of system performance over time, device or system documentation, device firmware revisions, or other such information relating to configuration and operating characteristics of the one or more boilers.

At 1404, demand data related to one or more loads associated with the boiler automation system is received at the cloud platform. For example, demand data associated with one or more loads can be a total demand (e.g., a required demand) associated with the one or more loads. In one example, a demand associated with each of the one or more loads can be added to determine a total demand (e.g., a required demand) associated with the one or more loads.

At 1406, a correlation between efficiency and capacity associated with the one or more boilers is modeled based on analysis of the industrial data and the demand data to yield a boiler behavioral model. The boiler behavioral model can be incrementally refined as new industrial data and/or new demand data is collected to produce a progressively higher fidelity model over time. At 1408, an iterative analysis of the boiler behavioral model is performed to identify set point parameters that satisfies a defined criterion. For example, iterative analysis of the boiler behavioral model can be performed to identify set point parameters associated with a maximum efficiency for the boiler automation system. At 1410, the set point parameters are sent to a client device authorized to access the cloud platform. A user of the client device (e.g., the user device) may then choose to implement the set point parameters for the boiler automation system.

Figure 15:
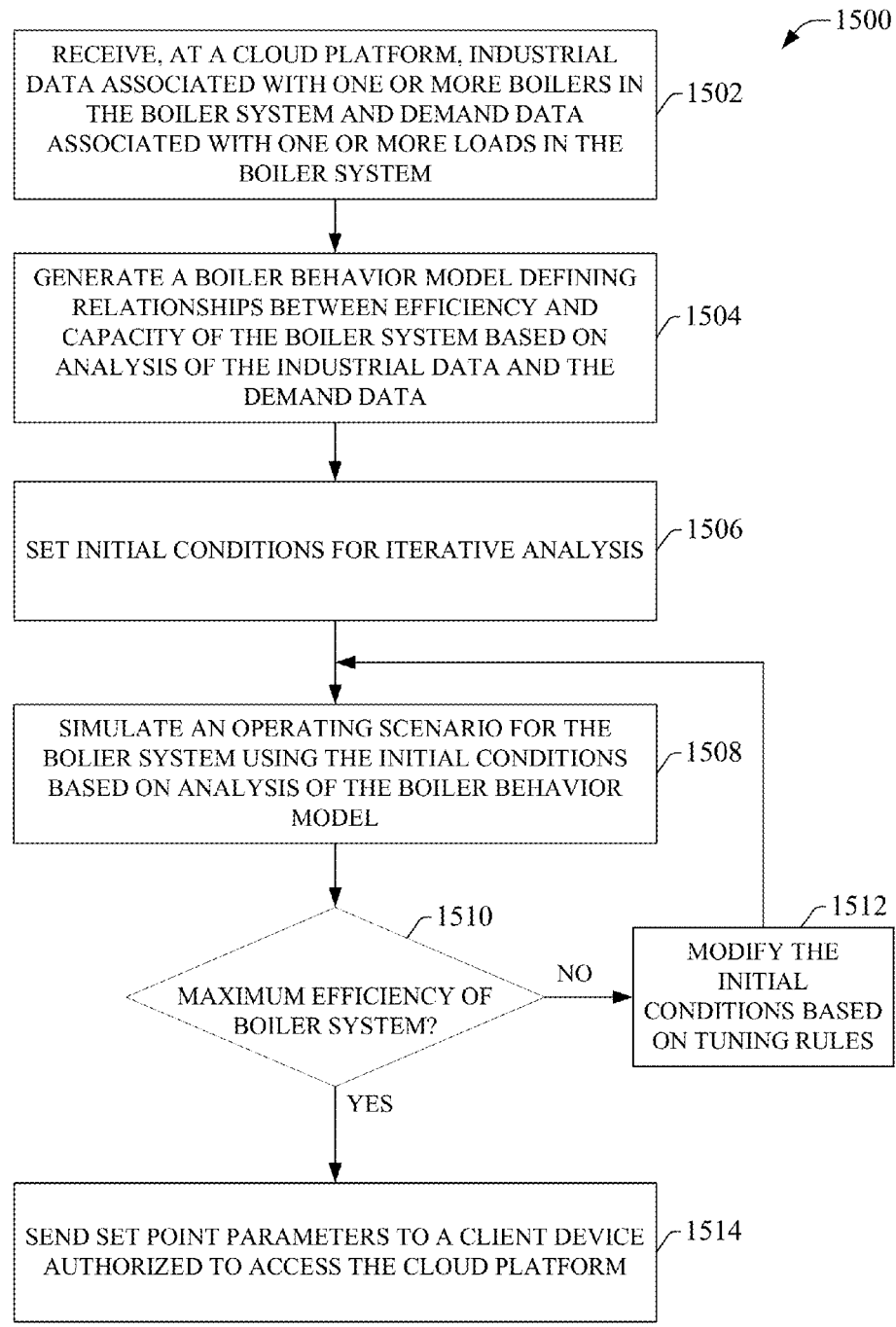
FIG. 15 is a flowchart of an example methodology for applying an iterative analysis technique in a cloud platform to identify substantially optimal set point parameters for a boiler control system.

FIG. 15 illustrates an example methodology 1500 for applying an iterative analysis technique in a cloud platform to identify substantially optimal set point parameters for a cloud-based boiler control system. Initially, at 1502, industrial data associated with one or more boilers in a boiler system and demand data associated with one or more loads in the boiler system are received at a cloud platform. At 1504, a boiler behavioral model defining relationships between efficiency and capacity of the boiler system is generated based on analysis of the industrial data and the demand data. At 1506, initial conditions are set for iterative analysis. At 1508, an operating scenario for the boiler system is simulated using the initial conditions based on analysis of the boiler behavioral model. At 1510, a decision is made regarding whether the operating scenario for the boiler system is associated with a maximum efficiency. If it is determined at 1510 that the operating scenario for the boiler system is not associated with a maximum efficiency, the methodology 1500 moves to 1512, where the initial conditions are modified based on tuning rules. The tuning rules (e.g., defined tuning rules) may specify, for example, how each initial condition should be adjusted as a function of the simulated operating scenario, etc. The methodology 1500 then returns to 1508, where the operating scenario for the boiler system is simulated using the initial conditions. Steps 1508-1512 are repeated until the boiler system is associated with a maximum efficiency, at which time the methodology 1500 moves to 1514, where set point parameters are sent to a client device authorized to access the cloud platform. The resulting set point parameters represent recommended set point parameters provided by the cloud-based boiler control system, which can be selectively applied by the end user to the actual boiler system (e.g., by entering or downloading the recommended set point parameters one or more devices of the boiler system).

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 16:
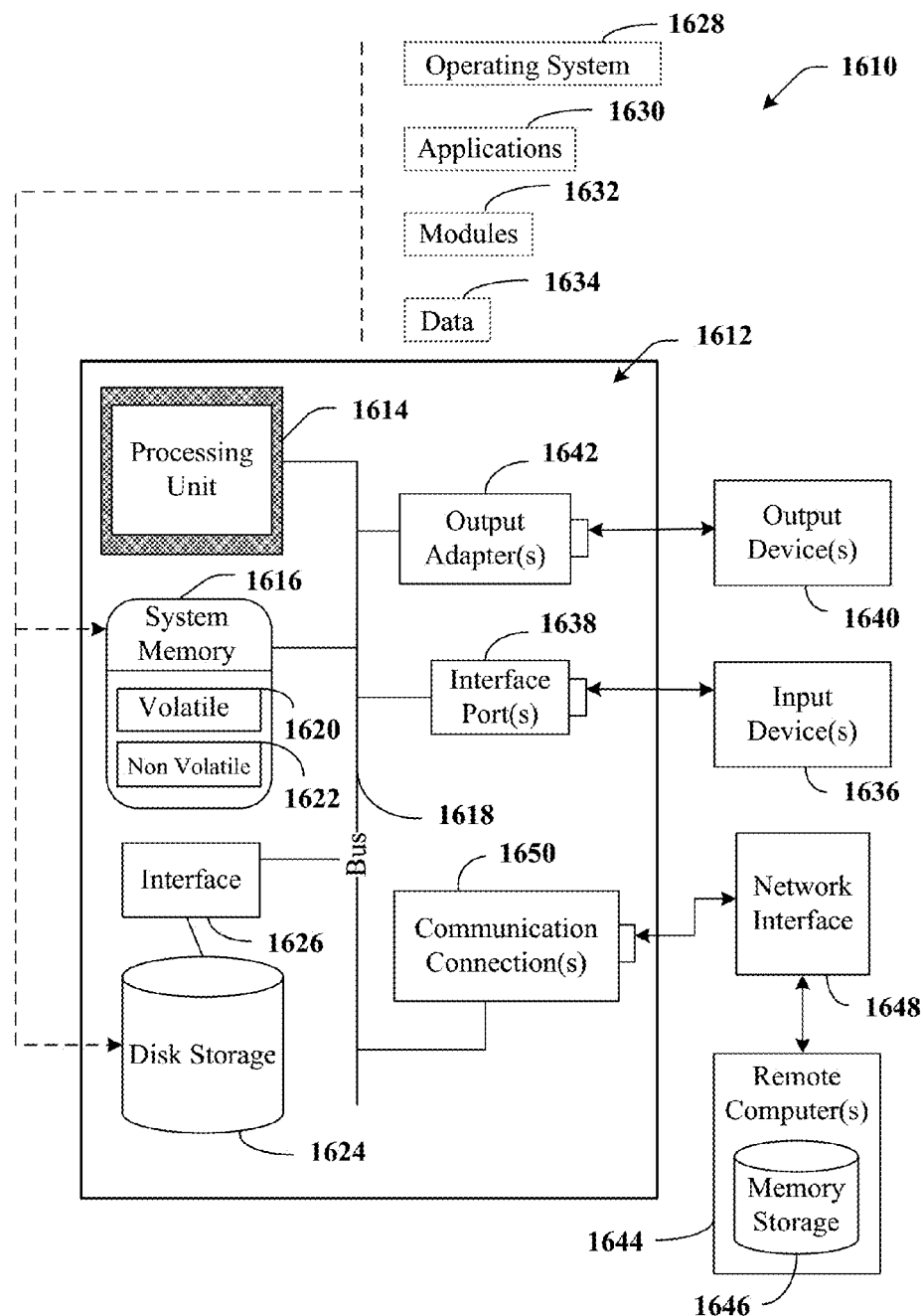
FIG. 16 is an example computing environment.
Figure 17:
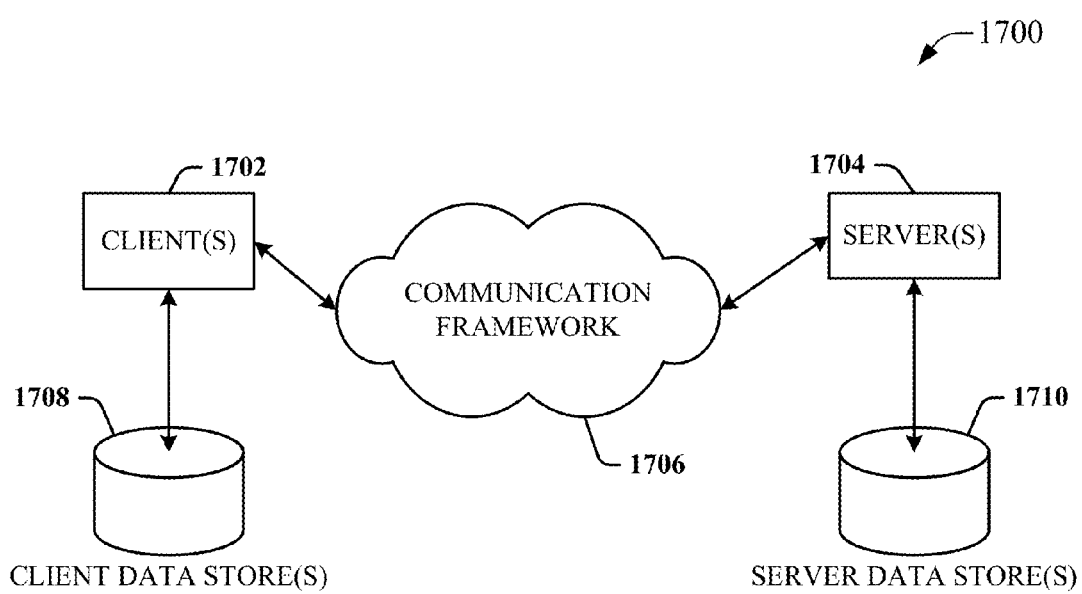
FIG. 17 is an example networking environment.

In order to provide a context for the various aspects of the disclosed subject matter, FIGS. 16 and 17 as well as the following discussion are intended to provide a brief, general description of a suitable environment in which the various aspects of the disclosed subject matter may be implemented.

With reference to FIG. 16, an example environment 1610 for implementing various aspects of the aforementioned subject matter includes a computer 1612. The computer 1612 includes a processing unit 1614, a system memory 1616, and a system bus 1618. The system bus 1618 couples system components including, but not limited to, the system memory 1616 to the processing unit 1614. The processing unit 1614 can be any of various available processors. Multi-core microprocessors and other multiprocessor architectures also can be employed as the processing unit 1614.

The system bus 1618 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1616 includes volatile memory 1620 and nonvolatile memory 1622. The basic input/output system (BIOS), containing the basic routines to transfer information between elements within the computer 1612, such as during start-up, is stored in nonvolatile memory 1622. By way of illustration, and not limitation, nonvolatile memory 1622 can include read only memory (ROM), programmable ROM (PROM), electrically programmable ROM (EPROM), electrically erasable PROM (EEPROM), or flash memory. Volatile memory 1620 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1612 also includes removable/non-removable, volatile/nonvolatile computer storage media. FIG. 16 illustrates, for example a disk storage 1624. Disk storage 1624 includes, but is not limited to, devices like a magnetic disk drive, floppy disk drive, tape drive, Jaz drive, Zip drive, LS-100 drive, flash memory card, or memory stick. In addition, disk storage 1624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1624 to the system bus 1618, a removable or non-removable interface is typically used such as interface 1626.

It is to be appreciated that FIG. 16 describes software that acts as an intermediary between users and the basic computer resources described in suitable operating environment 1610. Such software includes an operating system 1628. Operating system 1628, which can be stored on disk storage 1624, acts to control and allocate resources of the computer 1612. System applications 1630 take advantage of the management of resources by operating system 1628 through program modules 1632 and program data 1634 stored either in system memory 1616 or on disk storage 1624. It is to be appreciated that one or more embodiments of the subject disclosure can be implemented with various operating systems or combinations of operating systems.

A user enters commands or information into the computer 1612 through input device(s) 1636. Input devices 1636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1614 through the system bus 1618 via interface port(s) 1638. Interface port(s) 1638 include, for example, a serial port, a parallel port, a game port, and a universal serial bus (USB). Output device(s) 1640 use some of the same type of ports as input device(s) 1636. Thus, for example, a USB port may be used to provide input to computer 1612, and to output information from computer 1612 to an output device 1640. Output adapters 1642 are provided to illustrate that there are some output devices 1640 like monitors, speakers, and printers, among other output devices 1640, which require special adapters. The output adapters 1642 include, by way of illustration and not limitation, video and sound cards that provide a means of connection between the output device 1640 and the system bus 1618. It should be noted that other devices and/or systems of devices provide both input and output capabilities such as remote computer(s) 1644.

Computer 1612 can operate in a networked environment using logical connections to one or more remote computers, such as remote computer(s) 1644. The remote computer(s) 1644 can be a personal computer, a server, a router, a network PC, a workstation, a microprocessor based appliance, a peer device or other common network node and the like, and typically includes many or all of the elements described relative to computer 1612. For purposes of brevity, only a memory storage device 2246 is illustrated with remote computer(s) 1644. Remote computer(s) 1644 is logically connected to computer 1612 through a network interface 1648 and then physically connected via communication connection 1650. Network interface 1648 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1650 refers to the hardware/software employed to connect the network interface 1648 to the system bus 1618. While communication connection 1650 is shown for illustrative clarity inside computer 1612, it can also be external to computer 1612. The hardware/software necessary for connection to the network interface 1648 includes, for exemplary purposes only, internal and external technologies such as, modems including regular telephone grade modems, cable modems and DSL modems, ISDN adapters, and Ethernet cards.

FIG. 17 is a schematic block diagram of a sample computing environment 1700 with which the disclosed subject matter can interact. The sample computing environment 1700 includes one or more client(s) 1702. The client(s) 1702 can be hardware and/or software (e.g., threads, processes, computing devices). The sample computing environment 1700 also includes one or more server(s) 1704. The server(s) 1704 can also be hardware and/or software (e.g., threads, processes, computing devices). The servers 1704 can house threads to perform transformations by employing one or more embodiments as described herein, for example. One possible communication between a client 1702 and servers 1704 can be in the form of a data packet adapted to be transmitted between two or more computer processes. The sample computing environment 1700 includes a communication framework 1706 that can be employed to facilitate communications between the client(s) 1702 and the server(s) 1704. The client(s) 1702 are operably connected to one or more client data store(s) 1708 that can be employed to store information local to the client(s) 1702. Similarly, the server(s) 1704 are operably connected to one or more server data store(s) 1710 that can be employed to store information local to the servers 1704.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A cloud system communicatively coupled over a public network to a manufacturing system comprising a set of boilers, the cloud system comprising:
   a memory having stored thereon computer-executable components;
   a processor, operatively coupled to the memory, that executes the computer-executable components, the computer-executable components comprising:
      a system interface component configured to collect, over the public network, industrial data associated with an executing process of the set of boilers associated with a set of loads and demand data associated with the set of loads associated with the set of boilers, and store the industrial data and the demand data on the cloud system;
      a modeling component configured to generate a boiler behavioral model based on an analysis of the industrial data and the demand data, wherein the boiler behavioral model comprises at least one-efficiency curve between efficiency and capacity associated with the set of boilers, and store the boiler behavioral model on the cloud system; and
      a correlation analytics component configured to determine a respective value for each of at least one set point parameter for the set of boilers based on an iterative analysis of the boiler behavioral model and a defined optimization criterion; and
      wherein the system interface component further configured to issue a control command over the public network to at least one controller associated with the set of boilers, wherein the control command is configured to control the controller to employ the respective values of the at least one set point parameter during execution of the executing process of the set of boilers.

2. The cloud system of claim 1, further comprising a client interface component that sends the respective values of the at least one set point parameter to a client device communicatively connected to the cloud system.

3. The cloud system of claim 1, wherein the correlation analytics component is further configured to simulate an operating scenario for the set of boilers represented by initial conditions based on the boiler behavioral model.

4. The cloud system of claim 3, wherein the correlation analytics component is further configured to determine whether the operating scenario for the set of boilers is associated with a maximum efficiency.

5. The cloud system of claim 4, wherein the correlation analytics component is further configured to modify the initial conditions in response to a determination that the operating scenario for the set of boilers is not associated with the maximum efficiency.

6. The cloud system of claim 4, wherein the correlation analytics component is further configured to generate the respective values of the at least one set point parameter in response to a determination that the operating scenario for the set of boilers is associated with the maximum efficiency.

7. The cloud system of claim 3, wherein the correlation analytics component is further configured to apply a set of operational rules for the operating scenario.

8. The cloud system of claim 1, wherein the system interface component is further configured to generate one or more data sets based on the industrial data and the demand data.

9. The cloud system of claim 1, wherein the system interface component is further configured to receive at least a portion of the industrial data as a data packet from a cloud agent device associated with one or more of the set of boilers.

10. A method executed by a cloud system comprising at least one processor and communicatively coupled over a public network to an industrial boiler system comprising one or more boilers, the method comprising:
- receiving, over a public network by the cloud system comprising at least one processor, industrial data from the one or more boilers associated with a currently executing process of the industrial boiler system associated with one or more loads and demand data from the one or more loads of the industrial boiler system;
- creating, by the cloud system, a boiler behavioral model based on analysis of the industrial data and the demand data, wherein the boiler behavioral model comprises at least one-efficiency curve between efficiency and capacity associated with the one or more boilers;
- storing, by the cloud system, the boiler behavioral model on the cloud-based system;
- determining, by the cloud system, a respective value for each of at least one set point parameter for the one or more boilers based on an iterative analysis of the boiler behavioral model and a defined optimization criterion; and
- issuing, by the cloud system over the public network, a control command to at least one controller associated with the one or more boilers, wherein the control command initiates the controller to employ the respective values of the at least one set point parameter during execution of the executing process of the industrial boiler system.

11. The method of claim 10, further comprising sending, by the cloud system, the respective values of the at least one set point parameter to a client device that has authorization to access the cloud system.

12. The method of claim 10, further comprising simulating, by the cloud system, an operating scenario for the one or more boilers represented by initial conditions based on the boiler behavioral model.

13. The method of claim 12, further comprising determining, by the cloud system, whether the operating scenario for the one or more boilers is associated with a maximum efficiency.

14. The method of claim 13, further comprising modifying, by the cloud system, the initial conditions in response to a determination that the operating scenario for the one or more boilers is not associated with the maximum efficiency.

15. The method of claim 13, further comprising generating, by the cloud system, the respective values of the at least one set point parameter in response to a determination that the operating scenario for the one or more boilers is associated with the maximum efficiency.

16. The method of claim 12, further comprising applying, by the cloud system, a set of operational rules for the operating scenario.

17. The method of claim 10, wherein the receiving comprises:
- receiving at least a portion of the industrial data as a data packet from a cloud agent device associated with the one or more boilers; and
- processing the data packet in accordance with header information included in the data packet.

18. A non-transitory computer-readable medium having stored thereon instructions that, in response to execution, cause a cloud system comprising a processor and communicatively coupled over a public network to an industrial boiler system comprising one or more boilers to perform operations comprising:
- receiving, over the public network, industrial data from the one or more boilers associated with a currently executing process of the industrial boiler system associated with one or more loads and demand data from the one or more loads of the industrial boiler system;
- generating a boiler behavioral model based on analysis of the industrial data and the demand data, wherein the boiler behavioral model comprises at least one efficiency curve between efficiency and capacity associated with the one or more boilers;
- storing the boiler behavioral model;
- generating a respective value for each of at least one set point parameter for the one or more boilers based on an iterative analysis of the boiler behavioral model and a defined optimization criterion;
- transmitting, over the public network, a control command to at least one controller associated with the one or more boilers, wherein the control command controls the controller to employ the respective values of the at least one set point parameter during execution of the executing process of the industrial boiler system.

19. The non-transitory computer-readable medium of claim 18, the operations further comprising initiating a sending of the respective values of the at least one set point parameter to a client device.

20. The non-transitory computer-readable medium of claim 18, the operations further comprising simulating an operating scenario for the one or more boilers represented by initial conditions based on the boiler behavioral model.

* * * * *